US010315575B2

(12) United States Patent
Sobecki et al.

(10) Patent No.: US 10,315,575 B2
(45) Date of Patent: *Jun. 11, 2019

(54) EXTERIOR MIRROR ASSEMBLY WITH ACTUATOR

(71) Applicant: MAGNA MIRRORS OF AMERICA, INC., Holland, MI (US)

(72) Inventors: Justin E. Sobecki, Rockford, MI (US); Eric S. Deuel, Allendale, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/663,980

(22) Filed: Jul. 31, 2017

(65) Prior Publication Data
US 2017/0327041 A1 Nov. 16, 2017

Related U.S. Application Data

(63) Continuation of application No. 15/262,483, filed on Sep. 12, 2016, now Pat. No. 9,718,407, which is a continuation of application No. 15/005,093, filed on Jan. 25, 2016, now Pat. No. 9,440,587, which is a continuation of application No. 14/753,922, filed on Jun. 29, 2015, now Pat. No. 9,242,607, which is a continuation of application No. 13/663,542, filed on Oct. 30, 2012, now Pat. No. 9,067,541.

(60) Provisional application No. 61/665,504, filed on Jun. 28, 2012, provisional application No. 61/553,537, filed on Oct. 31, 2011.

(51) Int. Cl.
*G02B 7/182* (2006.01)
*B60R 1/072* (2006.01)
*B60R 1/074* (2006.01)

(52) U.S. Cl.
CPC ............... *B60R 1/072* (2013.01); *B60R 1/074* (2013.01)

(58) Field of Classification Search
CPC ........... B60R 1/072; B60R 1/074; B60R 1/07; B60R 1/06; B60R 1/078; B60R 1/02; B60R 1/064; B60R 1/066
USPC ........................................................ 359/877
See application file for complete search history.

(56) References Cited

U.S. PATENT DOCUMENTS

| 3,119,591 | A | 1/1964 | Malecki |
| 4,477,149 | A | 10/1984 | Crespy |
| 4,699,024 | A | 10/1987 | Iida et al. |
| 4,832,477 | A | 5/1989 | Torii et al. |

(Continued)

FOREIGN PATENT DOCUMENTS

WO WO20130126719 8/2013

*Primary Examiner* — Euncha P Cherry
(74) *Attorney, Agent, or Firm* — Honigman LLP

(57) ABSTRACT

An exterior rearview mirror system for a vehicle includes an exterior rearview mirror assembly having a mounting portion mountable at a side of a vehicle and a mirror head portion pivotally adjustable relative to the mounting portion. The mirror assembly includes an actuator operable to impart pivotal movement of the mirror head portion relative to the mounting portion to adjust the mirror head portion relative to the side of the vehicle at which the mounting portion is mounted. The actuator includes a first motor and a second motor that are operable in tandem to cooperatively rotatably drive a gear to cause the mirror head portion to pivot relative to the mounting portion. Operation of the first motor is synchronized with operation of the second motor.

20 Claims, 16 Drawing Sheets

(56) References Cited

U.S. PATENT DOCUMENTS

| | | |
|---|---|---|
| 5,005,797 A | 4/1991 | Maekawa et al. |
| 5,190,499 A | 3/1993 | Mori et al. |
| 5,210,651 A | 5/1993 | Shibuya et al. |
| 5,371,659 A | 12/1994 | Pastrick et al. |
| 5,424,898 A | 6/1995 | Larson et al. |
| 5,489,080 A | 2/1996 | Allen |
| 5,497,306 A | 3/1996 | Pastrick |
| 5,513,048 A | 4/1996 | Chen |
| 5,546,239 A | 8/1996 | Lewis |
| 5,572,376 A | 11/1996 | Pace |
| 5,579,178 A | 11/1996 | Mochizuki |
| 5,624,176 A | 4/1997 | O'Farrell et al. |
| 5,659,423 A | 8/1997 | Schierbeek et al. |
| 5,669,699 A | 9/1997 | Pastrick et al. |
| 5,703,731 A | 12/1997 | Boddy et al. |
| 5,786,772 A | 7/1998 | Schofield et al. |
| 5,796,176 A | 8/1998 | Kramer et al. |
| 5,823,054 A | 10/1998 | Brouwer |
| 5,823,654 A | 10/1998 | Pastrick et al. |
| 5,900,999 A | 5/1999 | Huizenga et al. |
| 5,903,402 A | 5/1999 | Hoek |
| 5,929,786 A | 7/1999 | Schofield et al. |
| 5,949,591 A | 9/1999 | Whitehead |
| 5,969,890 A | 10/1999 | Whitehead |
| 5,986,364 A | 11/1999 | Bingle et al. |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |
| 6,239,928 B1 | 5/2001 | Whitehead et al. |
| 6,243,218 B1 | 6/2001 | Whitehead |
| 6,276,821 B1 | 8/2001 | Pastrick et al. |
| 6,312,135 B1 | 11/2001 | Polzer |
| 6,325,518 B1 | 12/2001 | Whitehead et al. |
| 6,362,548 B1 | 3/2002 | Bingle et al. |
| 6,467,920 B2 | 10/2002 | Schnell et al. |
| 6,522,451 B1 | 2/2003 | Lynam |
| 6,565,221 B2 | 5/2003 | Guttenberger et al. |
| 6,582,109 B2 | 6/2003 | Miller |
| 6,685,864 B2 | 2/2004 | Bingle et al. |
| 6,698,905 B1 | 3/2004 | Whitehead |
| 6,717,712 B2 | 4/2004 | Lynam et al. |
| 6,755,544 B2 | 6/2004 | Schnell et al. |
| 6,882,287 B2 | 4/2005 | Schofield |
| 6,916,100 B2 | 7/2005 | Pavao |
| 6,981,774 B2 | 1/2006 | Dumont et al. |
| 7,038,577 B2 | 5/2006 | Pawlicki et al. |
| 7,073,914 B2 | 7/2006 | Pavao |
| 7,080,914 B1 | 7/2006 | Boddy |
| 7,093,946 B2 | 8/2006 | Barve et al. |
| 7,104,663 B2 | 9/2006 | Whitehead |
| 7,126,456 B2 | 10/2006 | Boddy et al. |
| 7,159,992 B2 | 1/2007 | Foote |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,267,449 B1 | 9/2007 | Boddy et al. |
| 7,314,285 B2 | 1/2008 | Ruse et al. |
| 7,441,912 B2 | 10/2008 | Onukl |
| 7,492,281 B2 | 2/2009 | Lynam et al. |
| 7,581,859 B2 | 9/2009 | Lynam |
| 7,626,749 B2 | 12/2009 | Baur et al. |
| 7,690,800 B2 | 4/2010 | Fukai et al. |
| 7,720,580 B2 | 5/2010 | Higgins-Luthman |
| 7,722,199 B2 | 5/2010 | DeWard et al. |
| 7,748,856 B2 | 7/2010 | Zhao |
| 7,883,224 B2 | 2/2011 | Onuki |
| 7,944,371 B2 | 5/2011 | Foote et al. |
| 8,169,684 B2 | 5/2012 | Bugno et al. |
| 8,366,285 B2 | 2/2013 | Reedman et al. |
| 9,067,541 B2 | 6/2015 | Sobecki et al. |
| 9,242,607 B2 | 1/2016 | Sobecki et al. |
| 9,440,587 B2 * | 9/2016 | Sobecki ............... B60R 1/074 |
| 9,718,407 B2 | 8/2017 | Sobecki et al. |
| 2006/0061008 A1 | 3/2006 | Karner et al. |
| 2007/0002477 A1 | 1/2007 | Whitehead |
| 2007/0285812 A1 | 12/2007 | Foote et al. |
| 2009/0040306 A1 | 2/2009 | Foote et al. |
| 2010/0182143 A1 | 7/2010 | Lynam |
| 2011/0194203 A1 | 8/2011 | Foote et al. |
| 2012/0236388 A1 | 9/2012 | De Wind et al. |

* cited by examiner

EXTERIOR MIRROR ASSEMBLY WITH ACTUATOR

CROSS REFERENCE TO RELATED APPLICATIONS

The present application is a continuation of U.S. patent application Ser. No. 15/262,483, filed Sep. 12, 2016, now U.S. Pat. No. 9,718,407, which is a continuation of U.S. patent application Ser. No. 15/005,093, filed Jan. 25, 2016, now U.S. Pat. No. 9,440,587, which is a continuation of U.S. patent application Ser. No. 14/753,922, filed Jun. 29, 2015, now U.S. Pat. No. 9,242,607, which is a continuation of U.S. patent application Ser. No. 13/663,542, filed Oct. 30, 2012, now U.S. Pat. No. 9,067,541, which claims the benefits of U.S. provisional applications, Ser. No. 61/665,504, filed Jun. 28, 2012, and Ser. No. 61/553,537, filed Oct. 31, 2011, which are hereby incorporated herein by reference in their entireties.

FIELD OF THE INVENTION

The present invention relates generally to exterior rearview mirror assemblies and, more particularly, to an exterior rearview mirror assembly that is adjustable relative to the side of the vehicle to which it is mounted.

BACKGROUND OF THE INVENTION

It is known to provide a vehicular exterior rearview mirror assembly that has a mirror head having a mirror casing that is adjustable relative to a mirror mounting portion at the side of the vehicle to which the mirror assembly is mounted. The mirror assembly may comprise a powerfold assembly where the mirror head is adjusted or pivoted relative to the vehicle via an actuator disposed at the mirror mounting portion and/or mirror head. Examples of adjustable or powerfold rearview mirror assemblies and actuators are described in U.S. Pat. Nos. 7,314,285; 7,267,449; 7,159,992; 7,093,946; 6,312,135; 6,243,218 and 5,703,731, which are hereby incorporated herein by reference in their entireties. As the size and/or electrical content of exterior rearview mirror assemblies is increased (such as for pickup trucks and the like), the weight of the mirror head portion likewise is increased, and a larger actuator motor or multiple gears or gear elements are required to provide sufficient torque output to pivot the mirror head via an actuator motor, with such multiple gears adding to the cost and complexity of the actuator assemblies.

SUMMARY OF THE INVENTION

The present invention provides an exterior rearview mirror assembly that has a mirror head portion (having a reflective element and mirror casing) that is adjustable via an actuator that moves or pivots the head portion sidewardly relative to a mounting arm or base portion of the mirror assembly. The actuator comprises a pair of motors that are cooperatively operable to rotatably drive a common gear of the actuator to pivot the head portion relative to the mounting arm or base portion.

According to an aspect of the present invention, an exterior rearview mirror assembly for a vehicle includes a mounting portion mounted to a side of a vehicle, a mirror head portion, a reflective element supported at or fixedly attached at or to the mirror head portion, and an actuator. The actuator is operable to impart pivotal movement of the head portion relative to the mounting portion to adjust the head portion and reflective element relative to the side of the vehicle at which the mounting portion is mounted. The actuator comprise a plurality of gears or gear elements that are rotatably driven via a pair of motors, whereby the pair of motors, such as responsive to a user input or the like, cooperate to rotatably drive a common drive gear that, when rotated, imparts rotational movement of another gear element and/or an attaching element that attaches to either the mirror head portion or the mounting portion, whereby such rotational movement in turn pivots or rotates the mirror head portion relative to the mounting portion of the mirror assembly.

Therefore, the dual motor actuator of the present invention includes two motors engaged with and driving a common gear. The dual motor arrangement provides increased output torque at the actuator while maintaining the tooth load (at the interface between the motor's output shaft or output gear and the common gear) on the first or common gear the same as for a single actuator motor (and thus allows for use of typical drive gears without having to implement stronger more robust gears to handle increased output torque of a larger single motor). The actuator of the present invention thus may be used in any mirror application that requires high torque output to pivot large and/or heavy mirror head portions, such as for trailer towing power fold mirror assemblies and/or power extend mirror assemblies and/or the like.

These and other objects, advantages, purposes and features of the present invention will become apparent upon review of the following specification in conjunction with the drawings.

DESCRIPTION OF THE PREFERRED EMBODIMENTS

Figure 1:
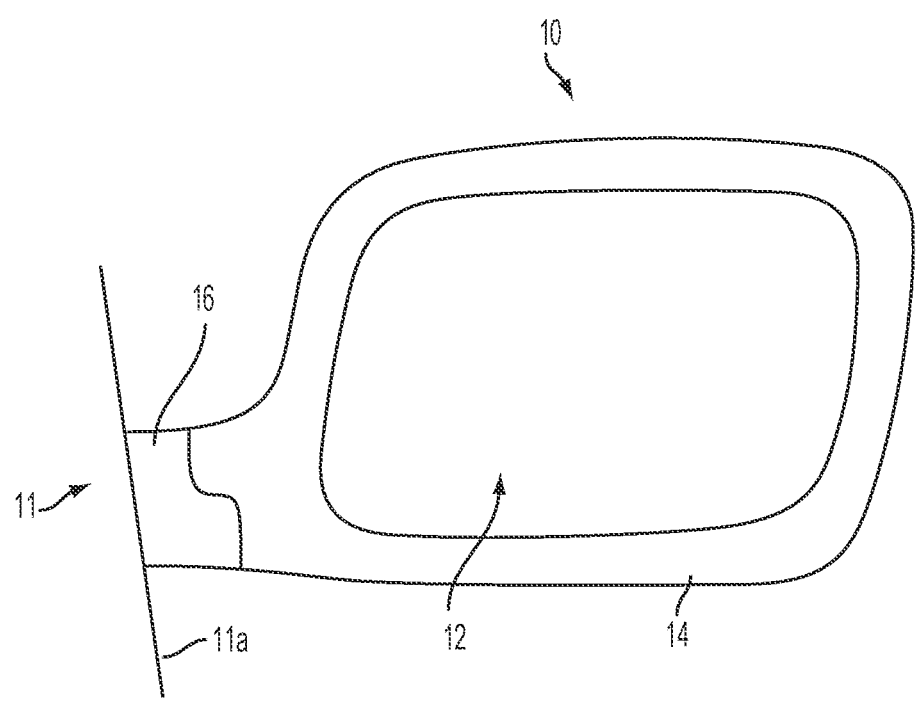
FIG. 1 is a rear view of an exterior rearview mirror assembly in accordance with the present invention.

Referring now to the drawings and the illustrative embodiments depicted therein, an exterior rearview mirror assembly 10 for a vehicle 11 includes a mirror reflector or reflective element 12 received in and/or supported at or by a mirror shell or casing or head portion 14 that is movably mounted to a mounting arm or base or portion or actuator receiver or housing 16 via an actuator assembly or adjustment device 18 (FIGS. 1-4). Mounting arm 16 of mirror assembly 10 is mounted at the side 11a of a host or subject vehicle 11, with the reflective element 12 providing a rearward field of view along the respective side of the vehicle to the driver of the vehicle. Actuator assembly 18 is received or disposed at least partially in mounting arm 16 (and/or at or at least partially in a side portion of the vehicle and/or at or at least partially in the mirror head portion of the mirror assembly) and is operable to pivot the mirror head portion 14 relative to the mounting arm 16 to adjust the mirror head between a rearward viewing position or orientation, where the mirror head portion and mirror reflective element are positioned so as to provide a rearward field of view to the driver of the vehicle (such as shown in FIG. 1), and a folded or stowed position (not shown), where the mirror head and reflective element are oriented generally along the side of the vehicle, as discussed below. The actuator assembly 18 includes at least two electrical drive motors 20, 22, which are cooperatively operable to rotatably drive a common drive gear 24 of a gear train or gear assembly 26 to pivot the mirror head portion 14 about a generally vertical pivot axis to adjust the mirror head portion 14 relative to the mounting arm 16, as also discussed below.

Mounting base or portion or arm 16 is fixedly mounted at a side portion of a vehicle, and comprises an elongated arm or body or member that extends outwardly from a vehicle attachment end, with the head portion 14 being pivotally or adjustably disposed at an outer or mirror attachment end of mounting arm 16. The mounting arm 16 comprises a generally hollow portion or cavity for receiving actuator assembly 18 therein, and a mirror head attaching portion 28 of actuator assembly 18 is disposed at the mirror attachment end of mounting arm 16 when the actuator assembly 18 is received in the mounting arm 16. Although shown as extending generally laterally outwardly from a vehicle mounting area at the side of the vehicle, the mounting arm or mounting portion or actuator housing may otherwise extend from the vehicle (such as generally upwardly and outwardly from the side of the vehicle) or may be at least partially recessed or received in or at the side of the vehicle, while remaining within the spirit and scope of the present invention.

The mirror head portion 14 is attached to mirror head attaching portion 28 of actuator assembly 18 via any suitable means. In the illustrated embodiment, a lower inboard region or portion of mirror head portion 14 is fixedly attached to an attaching ring or element or portion 28a of mirror head attaching portion 28 of actuator assembly 18, such as via a fastener or fasteners or via a snap-together configuration or via an adhesive or via any other suitable mechanical or bonding means. Mirror head portion 14 may comprise any suitable shape, such as an aerodynamic shape or form, and may be selectively sized for the particular application. Optionally, the mirror head portion 14 may house or support one or more mirror or vehicle accessories, such as exterior lights or blind spot indicators or turn signal indicators or the like (such as those discussed below), while remaining within the spirit and scope of the present invention.

Optionally, the reflective element may attach to a mounting surface of or at the mirror head portion or the reflective element may be received in or partially received in a receiving structure or bezel structure at the mirror head portion (and may be attached at a mounting plate or backing plate that may be adjustably mounted or disposed in the mirror casing and that may be adjustable via a powered mirror reflective element adjustment actuator to allow for adjustment of the mirror reflective element relative to the mirror casing to establish a desired rearward field of view to the driver of the vehicle), while remaining within the spirit and scope of the present invention. Reflective element 12 may comprise a single pane reflective element or an electro-optic reflective element (such as an electrochromic reflective element) with front and rear substrates and an electro-optic medium sandwiched therebetween, such as discussed below. Optionally, the reflective element may have a fillet or rounded edge or radius established around its perimeter edge, such as to meet safety regulations is exposed, and may not include a bezel portion that encompasses the perimeter edge of the reflective element when the reflective element is attached to the mirror head portion 14 (such as described in U.S. patent application Ser. No. 13/023,747, filed Feb. 9, 2011, now U.S. Pat. No. 8,915,601, which is hereby incorporated herein by reference in its entirety). The reflective element 12 is adjustably mounted or supported at or in or partially in mirror head portion 14, such as via a reflective element actuator or the like.

Actuator assembly 18 is operable to pivot or adjust mirror head portion 14 relative to mounting arm 16 such that the mirror head portion 14 is adjusted relative to mounting arm 16 about a generally vertical pivot axis. Actuator assembly 18 includes a housing portion 30 (having, in the illustrated embodiment, a lower housing portion 30a and an upper housing portion 30b) that is at least partially received in mounting arm 16 and that houses or supports the drive motors 20, 22, common gear 24 and gear train 26. The housing portions may be configured or molded to correspond to the shapes of the motor and to provide an inner cavity for receiving the motors 20, 22, common gear 24, gear train 26 and attaching portion 28, and the two housing portions 30a, 30b may attach or mate together (such as via snap clasps 30c or the like) to contain or house the components therein, with the attaching portion exposed at an opening or aperture of the upper housing portion 30b.

In the illustrated embodiment, actuator assembly 18 comprises rotary motor 20 disposed within lower housing portion 30a, with rotary motor 22 disposed over or on top of rotary motor 20 (with a spacer or support element 32 disposed between motors 20, 22). However, although shown as being stacked atop one another, clearly the motors 20, 22 may be otherwise disposed at or in the housing portion (such as in a side-by-side arrangement or the like), while remaining within the spirit and scope of the present invention. Rotary motors 20, 22 comprise electrically powered motors, which may be electrically connected to a power source of the vehicle, such as via electrical leads of the motors electrically connecting to a vehicle wiring harness at the side of the vehicle and at the mirror mounting portion. The motors may be electrically connected together such that a single electrical lead or wiring harness extends from the actuator for electrically connecting to the vehicle wiring harness or vehicle electrical connector.

The rotary motors 20, 22 have rotationally driven output shafts 20a, 22a with respective worm gears 20b, 22b attached to the output shafts 20a, 22a. The output shafts 20a, 22a and worm gears 20b, 22b are generally parallel to one another, with the common gear 24 disposed between the worm gears 20b, 22b and having teeth that engage the teeth of both worm gears 20b, 22b (with the worm gears engaging teeth of the common gear at diametrically opposed sides or regions of the common gear) so that, when the worm gears 20b, 22b are rotationally driven by motors 20, 22, both worm gears 20a, 22b cooperatively rotate and drive the common gear 24 about its axis, as discussed below. Optionally, other arrangements of the motors and gears may be implemented, such as non-parallel arrangements of the motors and worm gears, with the motor output gears engaging other regions of a common gear and cooperatively driving the common gear, while remaining within the spirit and scope of the present invention.

In the illustrated embodiment, common gear 24 is connected to or joined with a worm gear 34 that is rotatable about a common axis of rotation or shaft 36 with common gear 24 when common gear 24 is rotated via motors 20, 22. As shown in FIGS. 5-8, shaft 36 is generally transverse to output shafts 20a, 22a and worm gears 20b, 22b of drive motors 20, 22. Worm gear 34 is disposed along and in toothed engagement with a ring gear 38 that is rotatably supported (such as via bearings 40) at the lower housing portion 30a, so that ring gear 38 is rotatable about a generally vertical axis of rotation when the actuator assembly and exterior rearview mirror assembly are normally mounted at a side of a vehicle. The mirror head attaching portion 28 is fixedly attached at an attaching portion 42 (such as via ribs or projections of an actuator attaching portion 28b of attaching portion 28 being received at or partially in slots or receiving portions 42a of attaching portion, such as can be seen with reference to FIG. 2) at ring gear 38, such that rotation of ring gear 38 imparts a corresponding rotation of mirror head attaching portion 28 and thus of the mirror head portion 14 about the generally vertical axis of rotation and relative to the side of the vehicle equipped with the exterior rearview mirror assembly 10.

Optionally, the gear assembly or gear train 26 may include a clutch assembly (such as at the gear shaft 36), which may include a gear element and biasing element or spring. Such a clutch assembly may allow for slippage between the gear elements their shaft to allow for manual adjustment of the mirror head portion 14 relative to the mounting portion or arm 16. Clearly, the motor and gear assembly may comprise more or less gear elements depending on the particular application of the actuator and the desired torque and speed applied during mirror adjustment.

Figure 2:
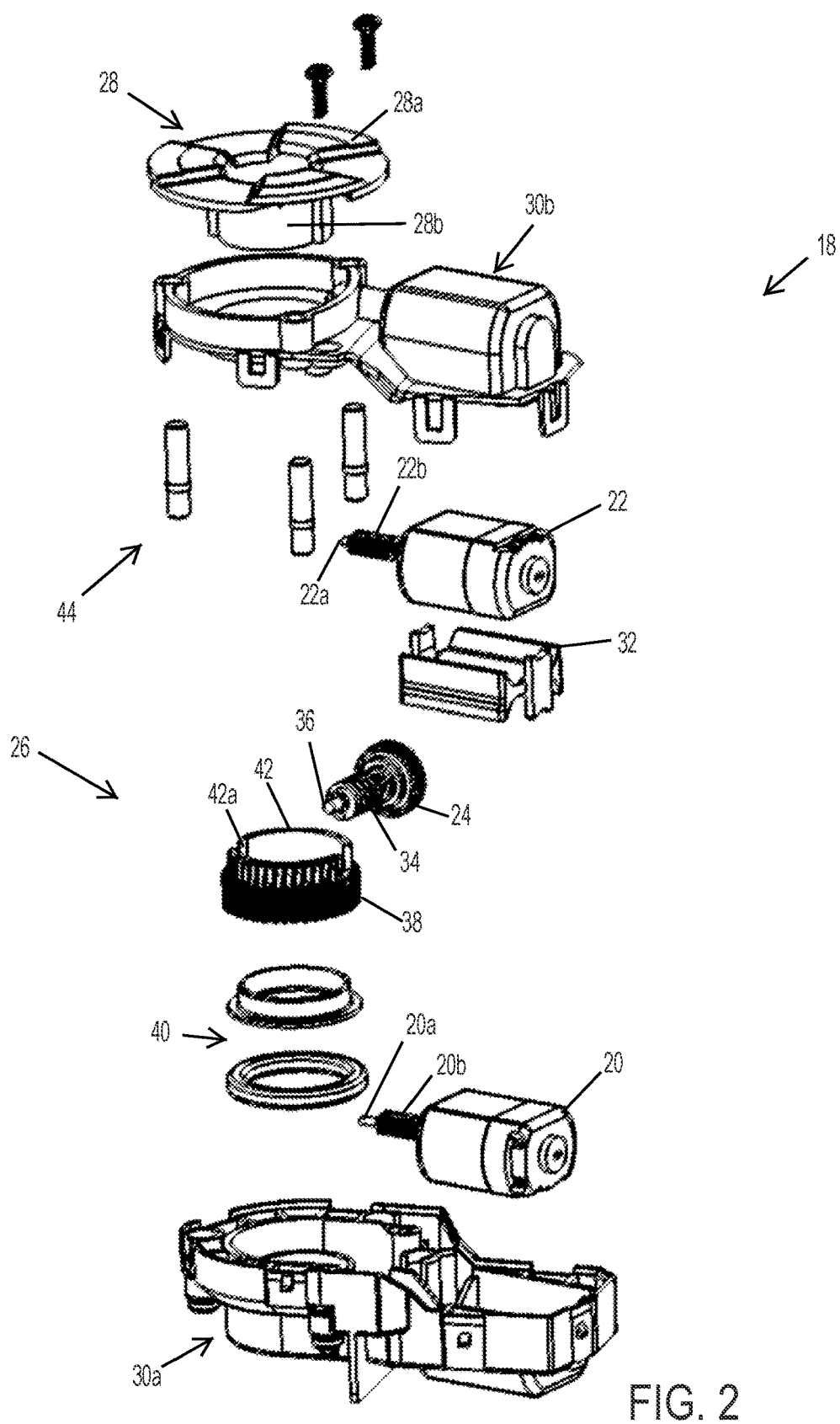
FIG. 2 is an exploded perspective view of an actuator of an exterior rearview mirror assembly of the present invention.
Figure 3:
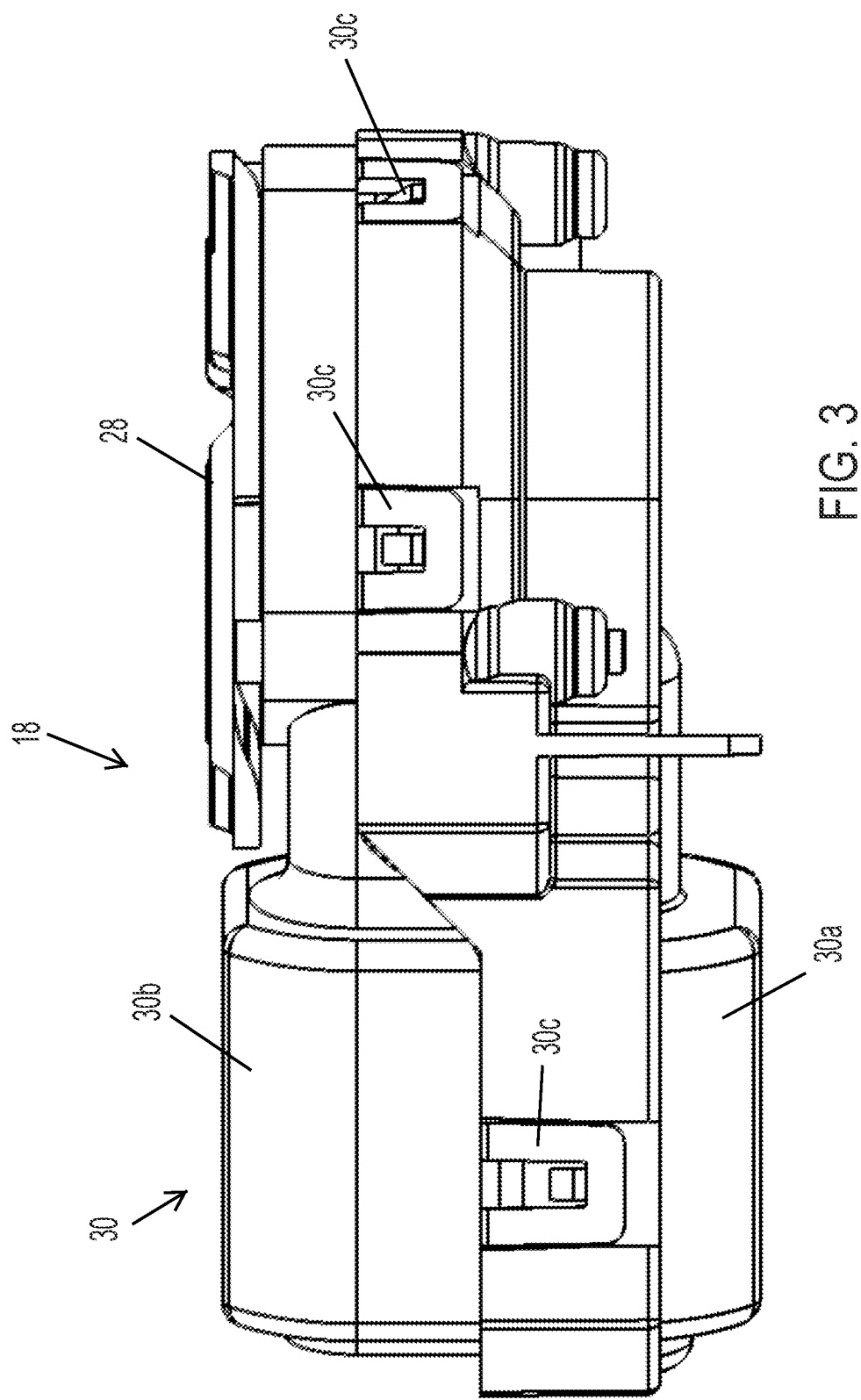
FIG. 3 is a side elevation of the actuator of FIG. 2.
Figure 4:
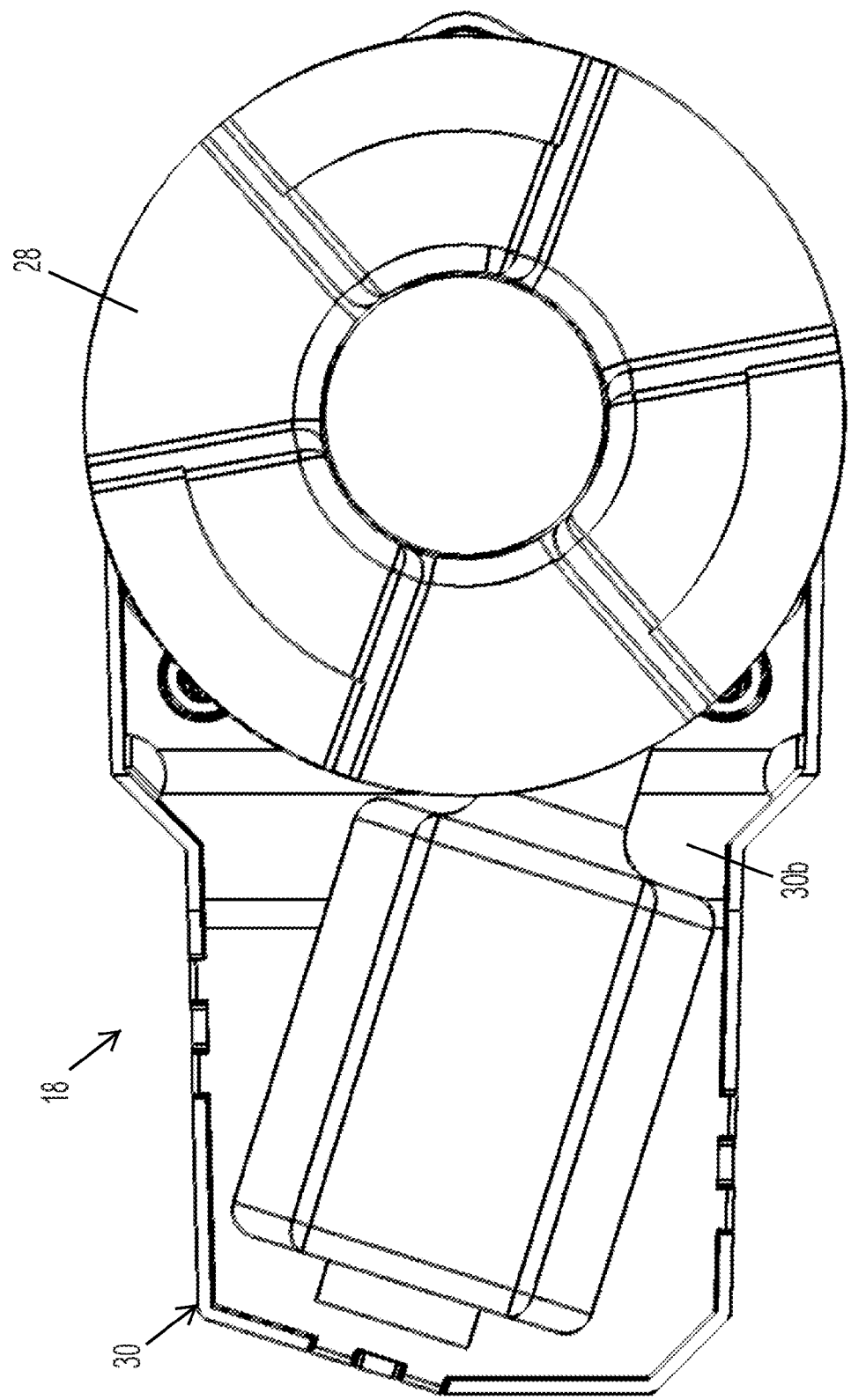
FIG. 4 is top plan view of the actuator of FIG. 2.
Figure 5:
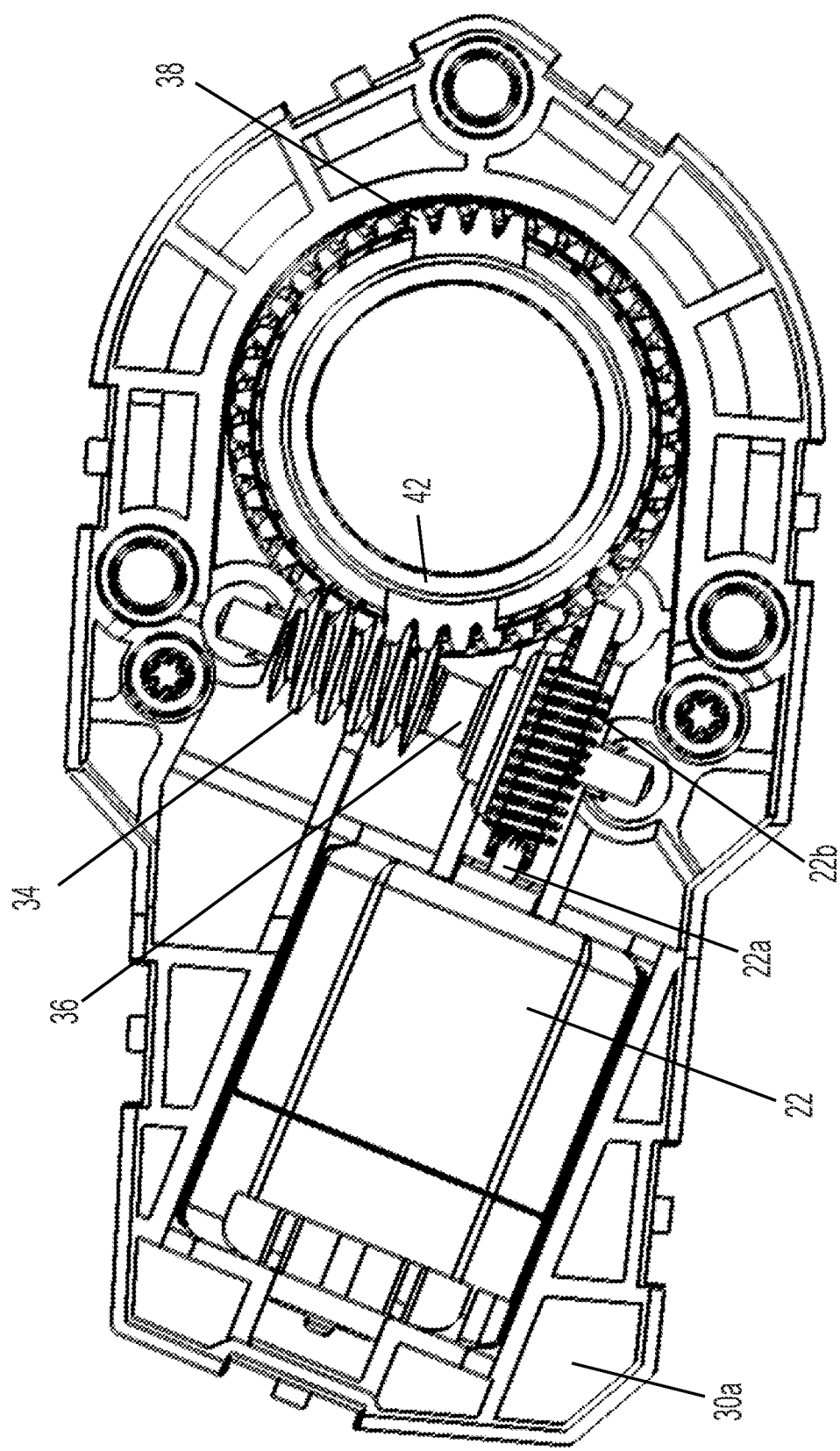
FIG. 5 is another top plan view of the actuator of the present invention, shown with the upper casing portion removed to show additional details.
Figure 6:
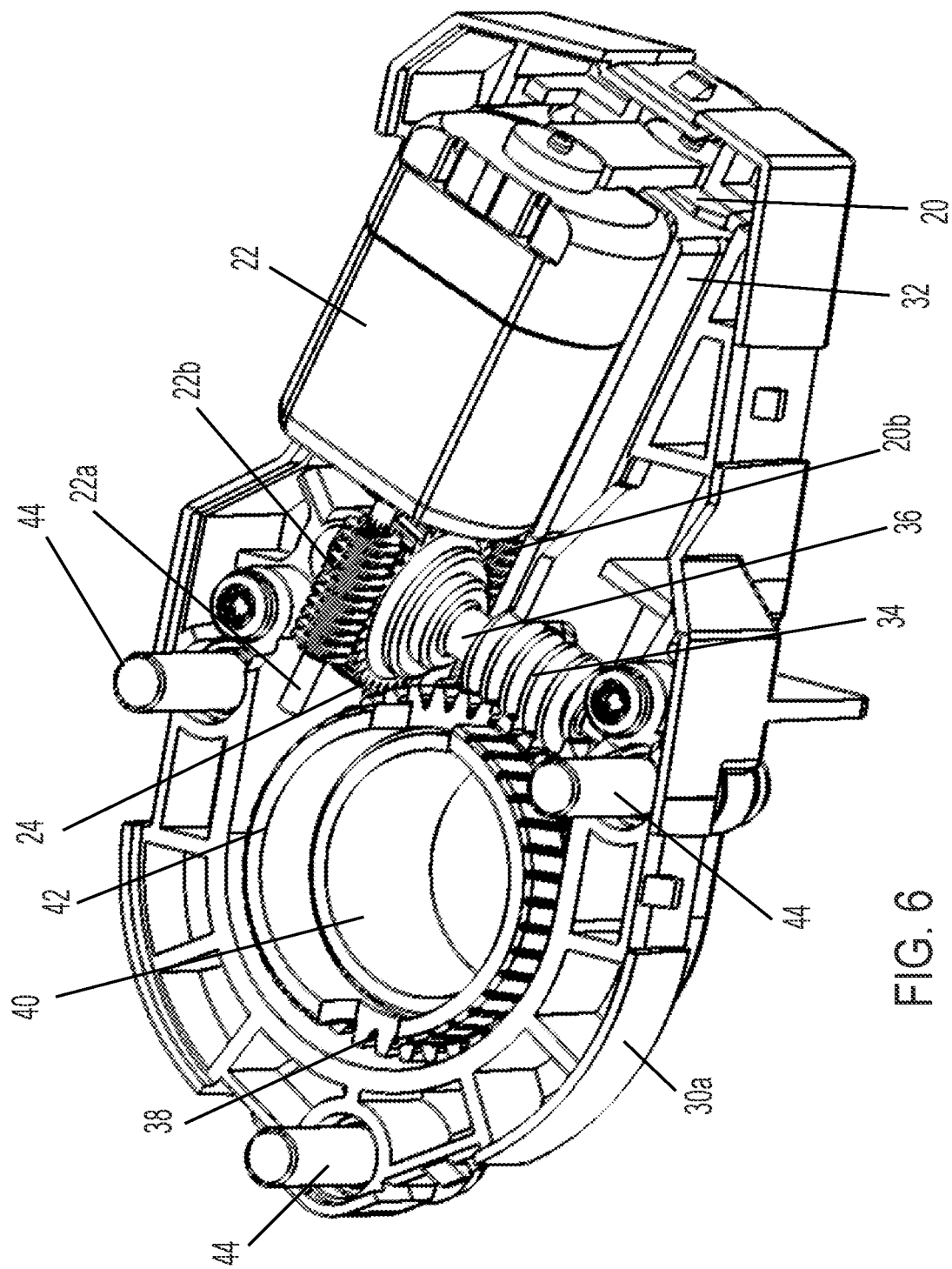
FIG. 6 is a perspective view of the actuator of FIG. 5.
Figure 7:
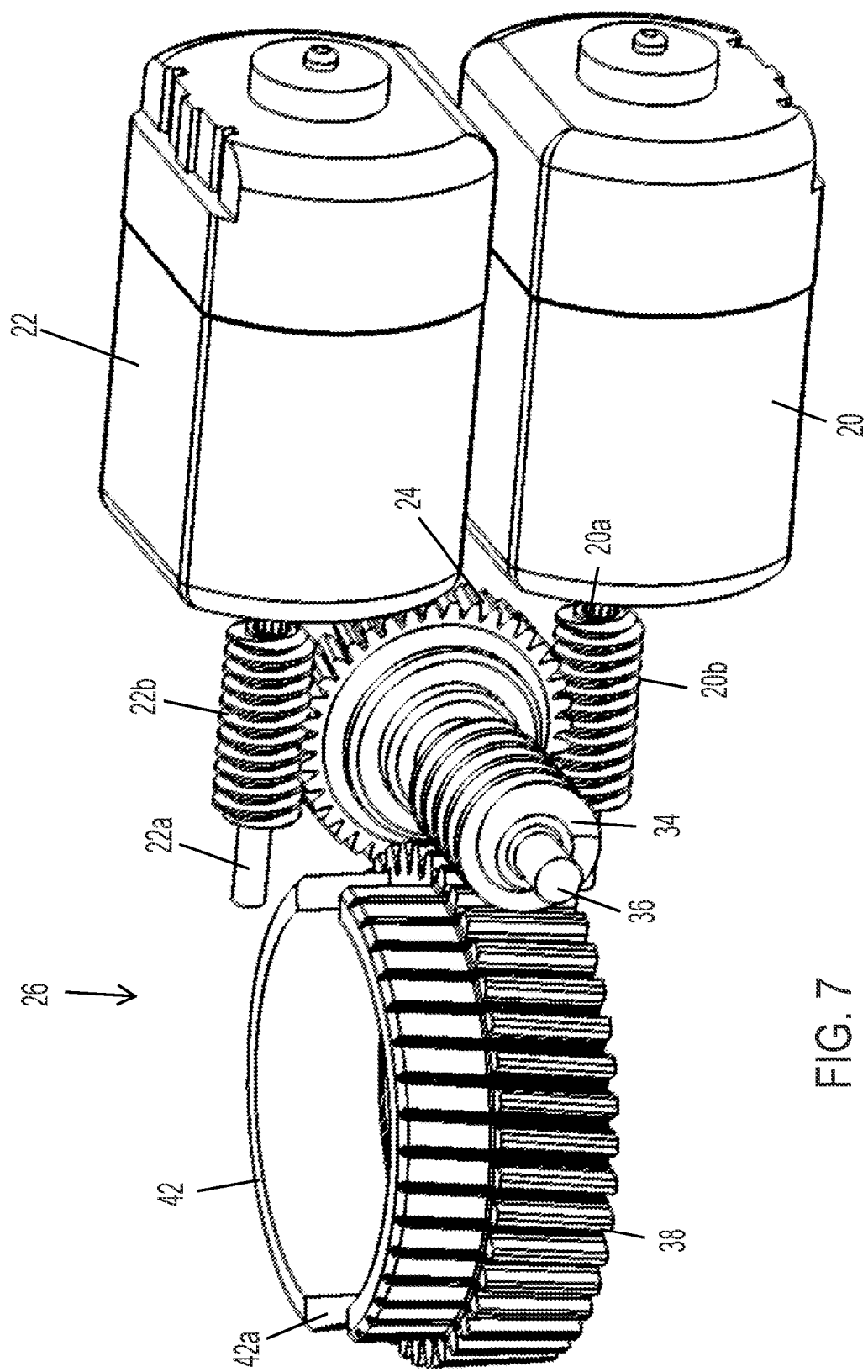
FIG. 7 is a perspective view of the motors and gear train of the actuator of the present invention, shown with the casing removed to show additional details.
Figure 8:
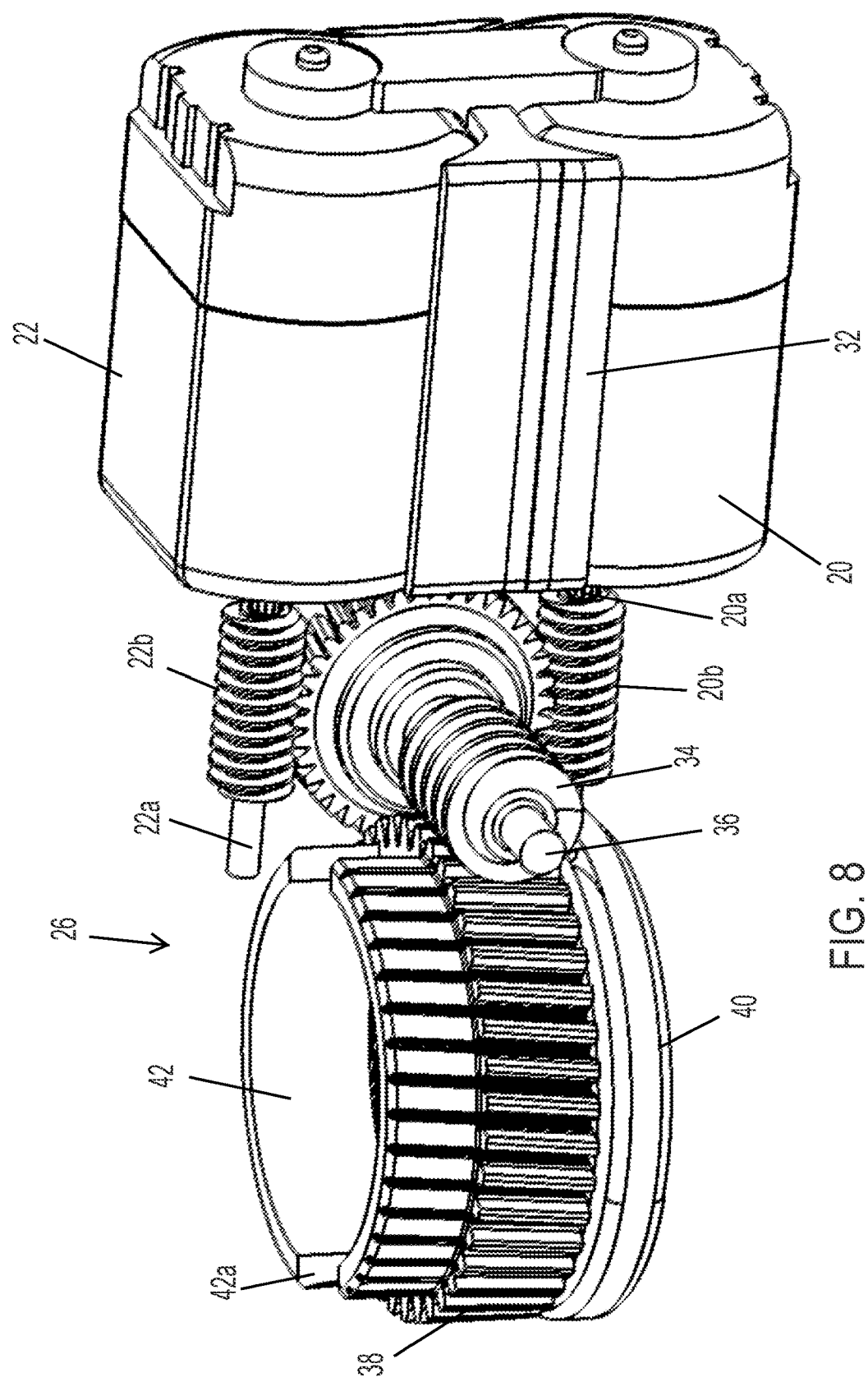
FIG. 8 is another perspective view of the motors and gear train of the actuator of FIG. 7, shown with bearings and motor spacers in accordance with the present invention.

Optionally, a plurality of travel stop pins 44 (such as three stop pins as shown in FIGS. 2 and 6) may be disposed at the housing (such as at the lower housing portion 30a) to limit pivotal movement of the attaching portion 28. For example, the attaching plate or portion 28 may have a mating groove in and along which the stop pins travel when the attaching portion is rotated via operation of the motors 20, 22. The groove terminates at each end at a wall, which the respective stop pin engages to limit or stop further rotational or pivotal movement of the attaching portion relative to the housing.

Thus, the fixed housing 30 holds or supports or houses the motors 20, 22 and gear train 26, and is fixedly mounted to or in the mirror base portion 16. The rotatable attaching portion 28 of the actuator 18 is attached to the mirror head and is driven by the ring gear 38 of gear train 26 to rotate the rotating attaching portion 28 and mirror head 14 relative to the fixed housing 30 and mounting portion 16. Optionally, the mirror head portion 14 and/or reflective element 12 may be manually adjusted by a person or user via the slippage of the gear elements of the clutches.

Accordingly, the present invention provides a mirror actuator that is disposed at a fixed portion of the mirror or of the vehicle, such as at the mounting portion or base portion of the mirror assembly. The actuator thus is fixedly mounted to the mirror base (which is fixedly attached to the vehicle, such as at the door or fender area) and the mirror head is attached to a rotatable mirror attaching portion of the actuator. The actuator includes two motors that cooperate or work in tandem to rotatably drive a common gear element, which in turn rotatably drives the gear train and the rotatable mirror attaching portion. The motors are driven at the same speed and are synchronized so that both motors provide similar output to or driving of the common gear.

By providing two drive motors, the present invention substantially increases the torque applied to the gear train and, thus, can fold or pivot a larger, heavier mirror head that would otherwise require a substantially larger motor (which may be difficult to package at the mirror mounting portion or base) or additional gear elements to increase the torque output from a single drive motor (which may also be difficult to package at the mirror mounting portion or base and would add to the complexity and cost of the mirror actuator). The addition of a second motor that is substantially synchronized with a first motor nearly doubles the output torque at the common gear (as compared to the output of a single motor of the same power type), and may provide up to or greater than about 90 percent to 95 percent more torque at the common gear, without requiring complex and costly gear trains with multiple gears to increase the torque from a single motor to a desired or appropriate torque at a mirror head.

Optionally, and desirably, the mirror system or actuator system may operate to deactivate the motors when the system or circuit determines that the mirror is in a stalled condition. For example, it is known to measure the current being drawn by a motor and if that current exceeds a predetermined trip point, a system or control may remove power from the motor. Such a trip point is frequently set to turn off the motor in the event of a stall condition. A concern or potential shortcoming with this type of circuit is that the motor and circuit parameters change with environment, particularly temperature. This change in system parameters affects the operating point of the system such that the normal run current can approach that of the stall current and can cause the shutoff circuit to trip before a true stall condition is reached. Another issue with such known shutoff circuits is that a shutoff circuit of this type must be changed for each new trip current that needs to be detected. Thus, such shutoff circuits are not very flexible circuits where multiple systems with different loads need to be controlled.

Optionally, and desirably, the mirror system or actuator system may operate with a stall detection or run detection shutoff circuit (FIGS. 9 and 10), whereby the motors are deactivated when the system or circuit determines that the mirror is in a stalled condition. The present invention provides a shutoff circuit that is operable to detect or determine if a motor is moving when power is applied (rather than measuring the current being drawn by the motor). As long as the motor is moving, it is not in a stall condition and thus the system allows the motor to continue to run regardless of the current draw. Once the motor stops moving, the circuit detects the stall condition and removes power from the motor. An advantage provided by this circuit is that the motor is allowed to run regardless of environmental conditions affecting the current draw of the motor and thus the system can function in conditions where it may otherwise not be able to function. This circuit is also applicable across a much wider range of implementations—up to the physical limitations of the components—as it is not current draw dependent. Optionally, the system may also have a current draw threshold level at which the motor is shut off (to protect the motor), but that may be a significantly higher level than typical shutoff circuits.

Figure 9:
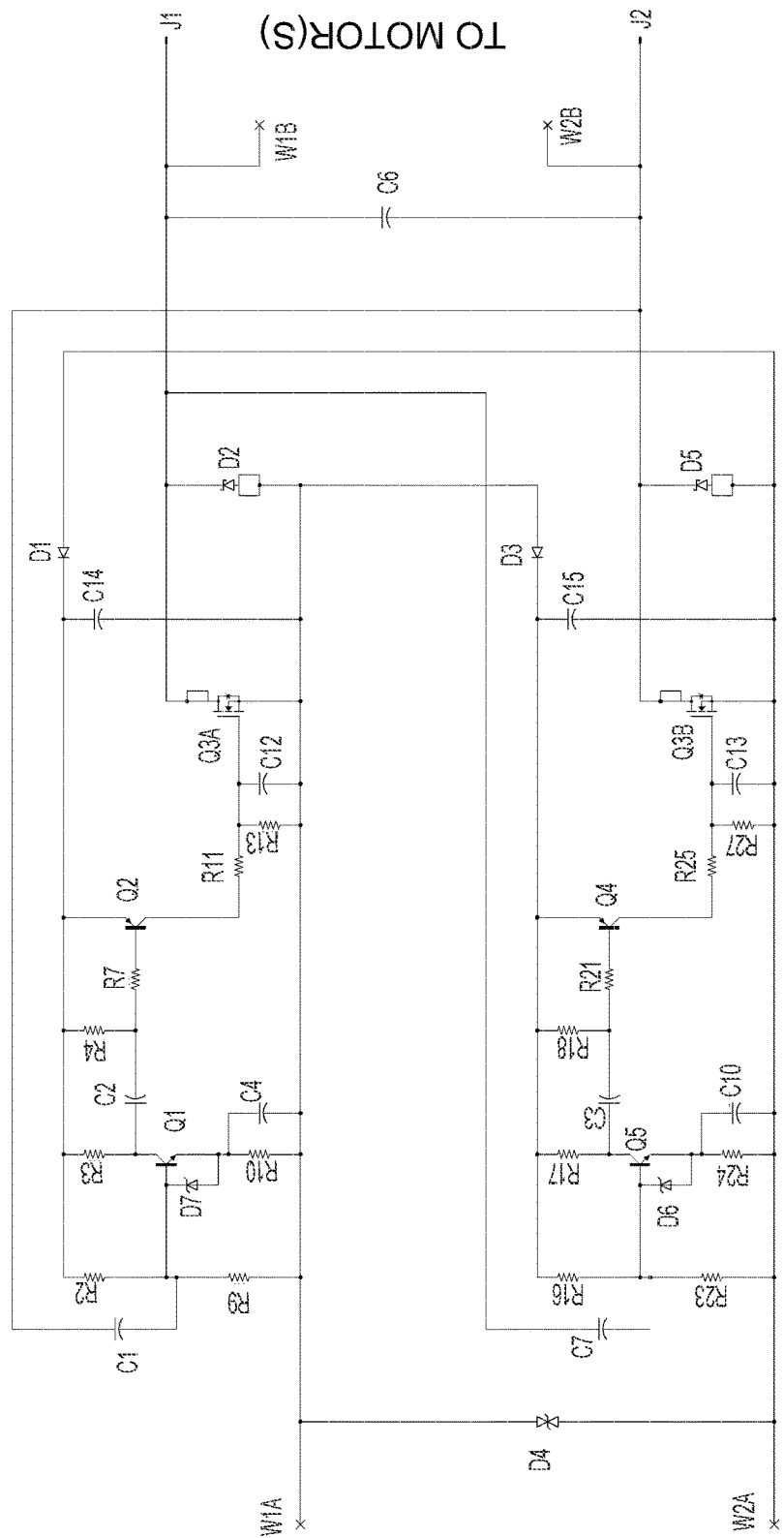
FIG. 9 is a schematic of a run detection shutoff circuit for the actuator motors of the present invention.
Figure 10:
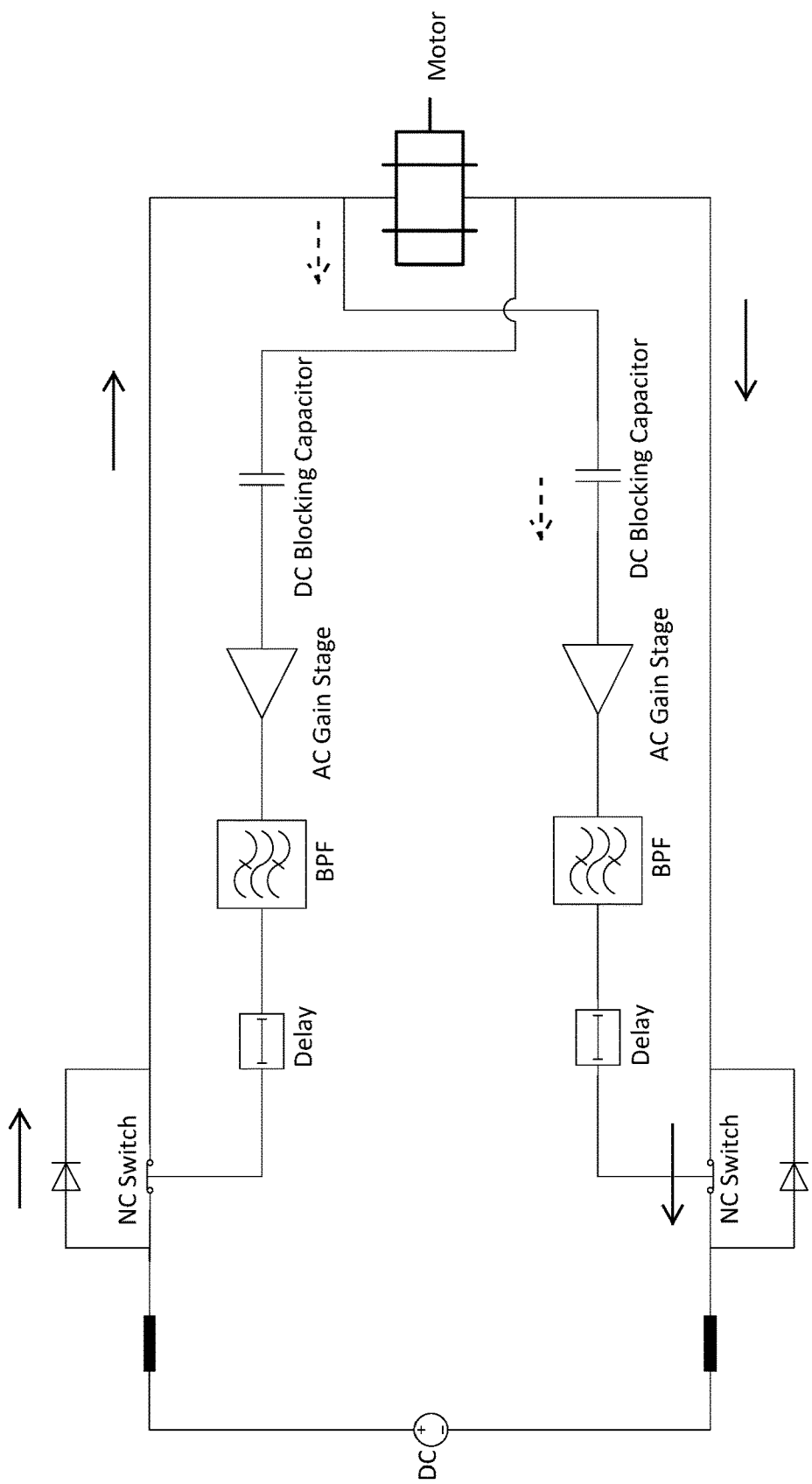
FIG. 10 is a functional block diagram of a run detection shutoff circuit for the actuator motors of the present invention.
Figure 11:
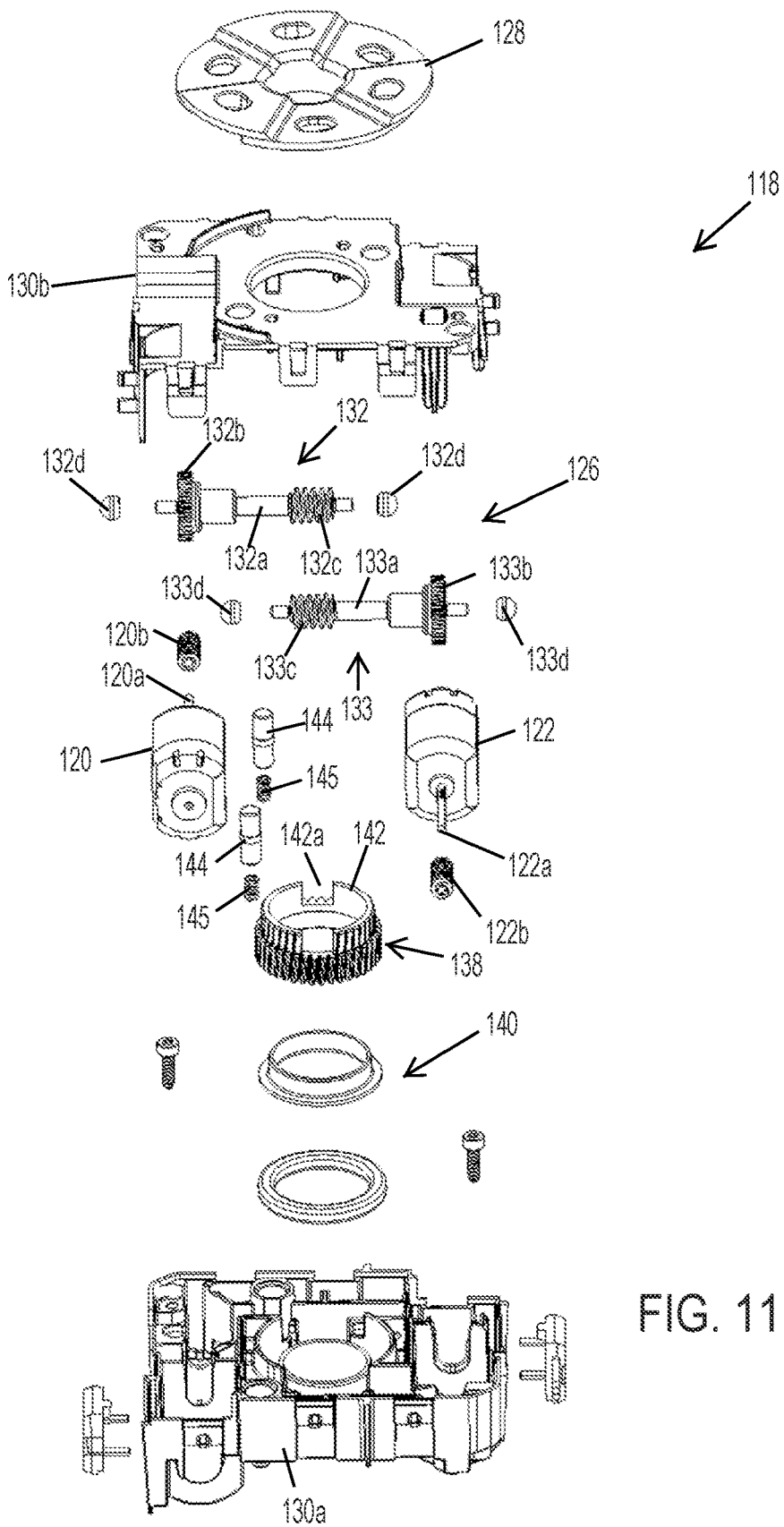
FIG. 11 is an exploded perspective view of another actuator of an exterior rearview mirror assembly of the present invention.
Figure 13:
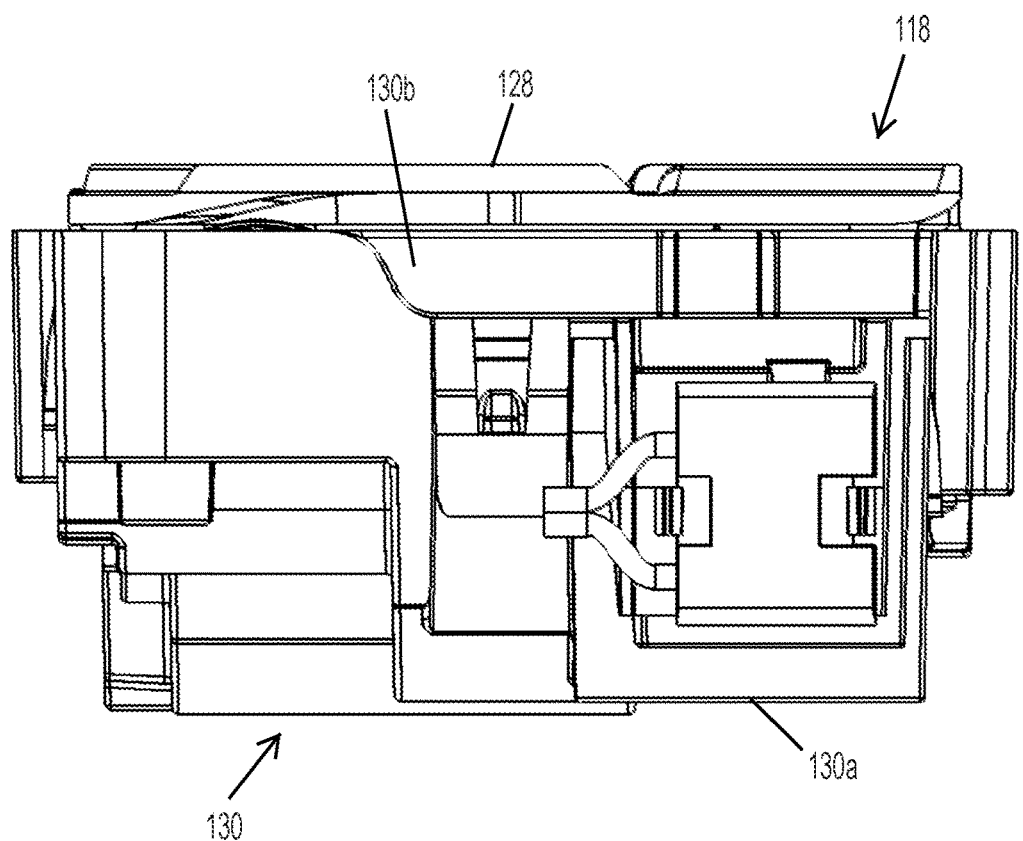
FIG. 13 is another side elevation of the actuator of FIG. 11.
Figure 12:
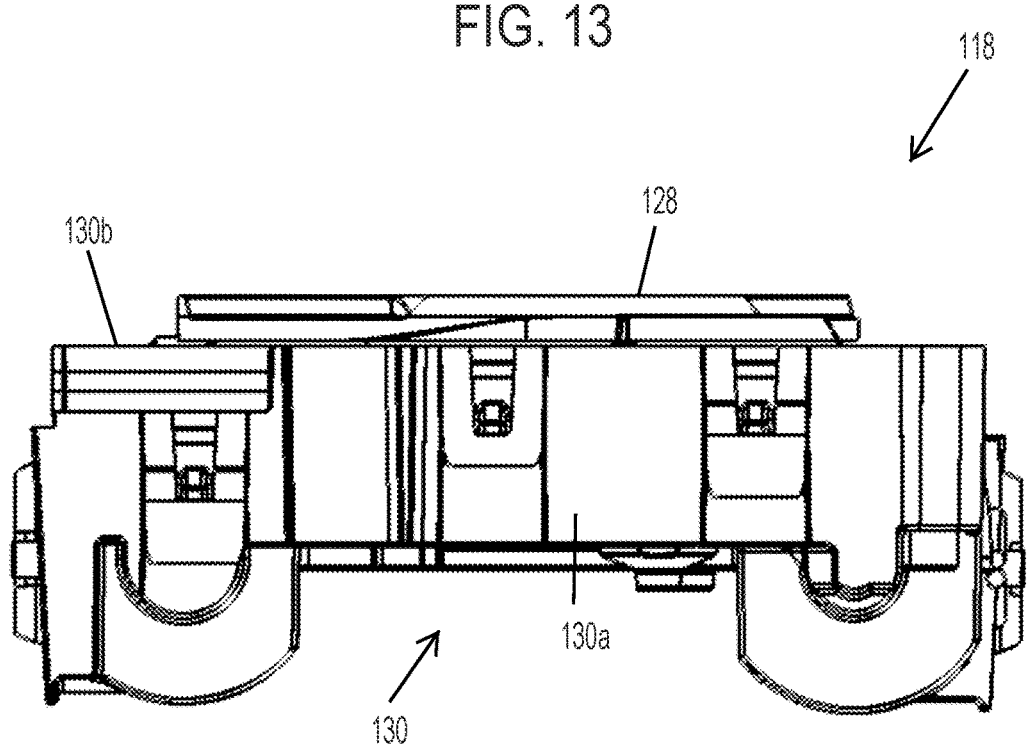
FIG. 12 is a side elevation of the actuator of FIG. 11.
Figure 14:
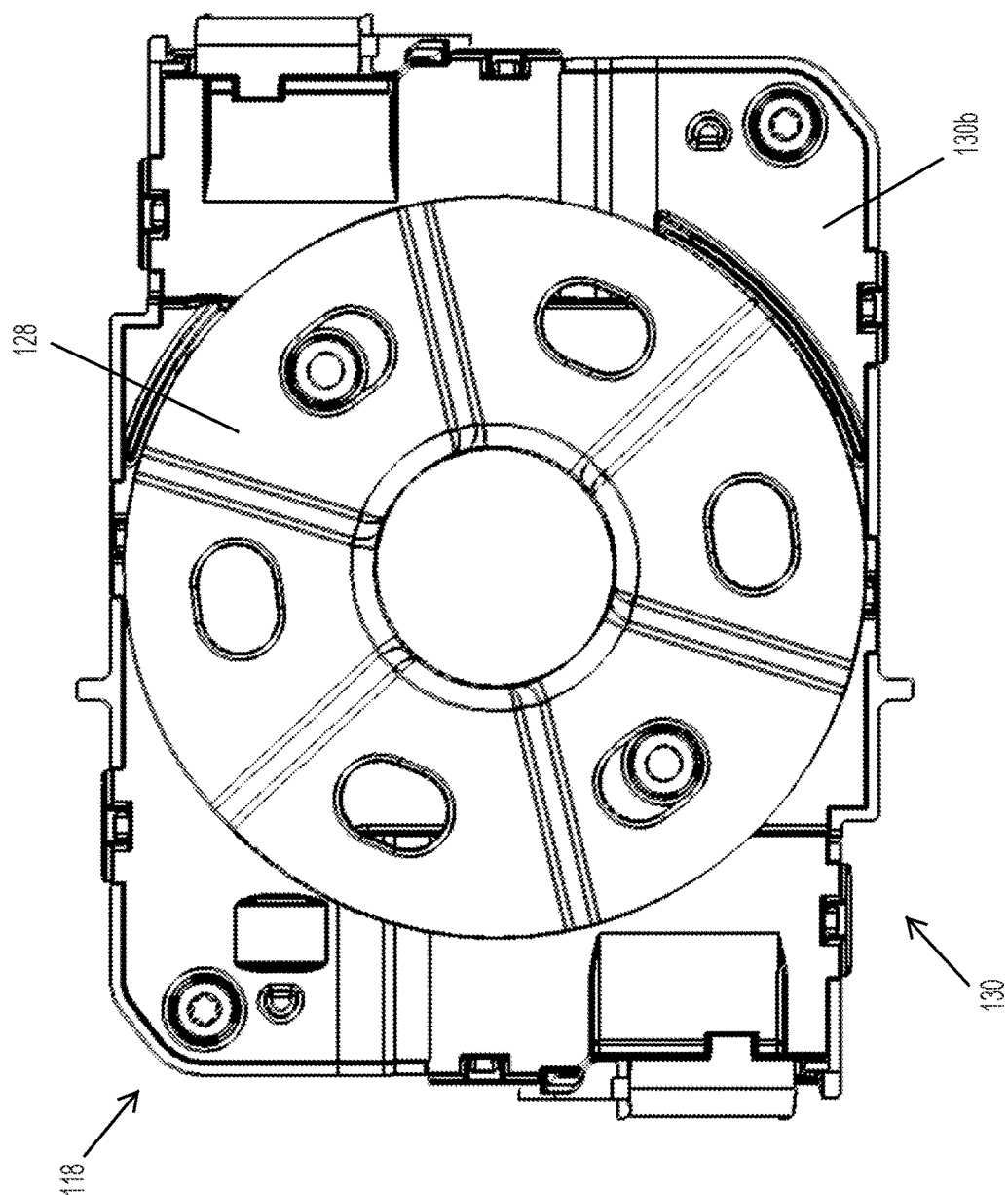
FIG. 14 is a top plan view of the actuator of FIG. 11.
Figure 15:
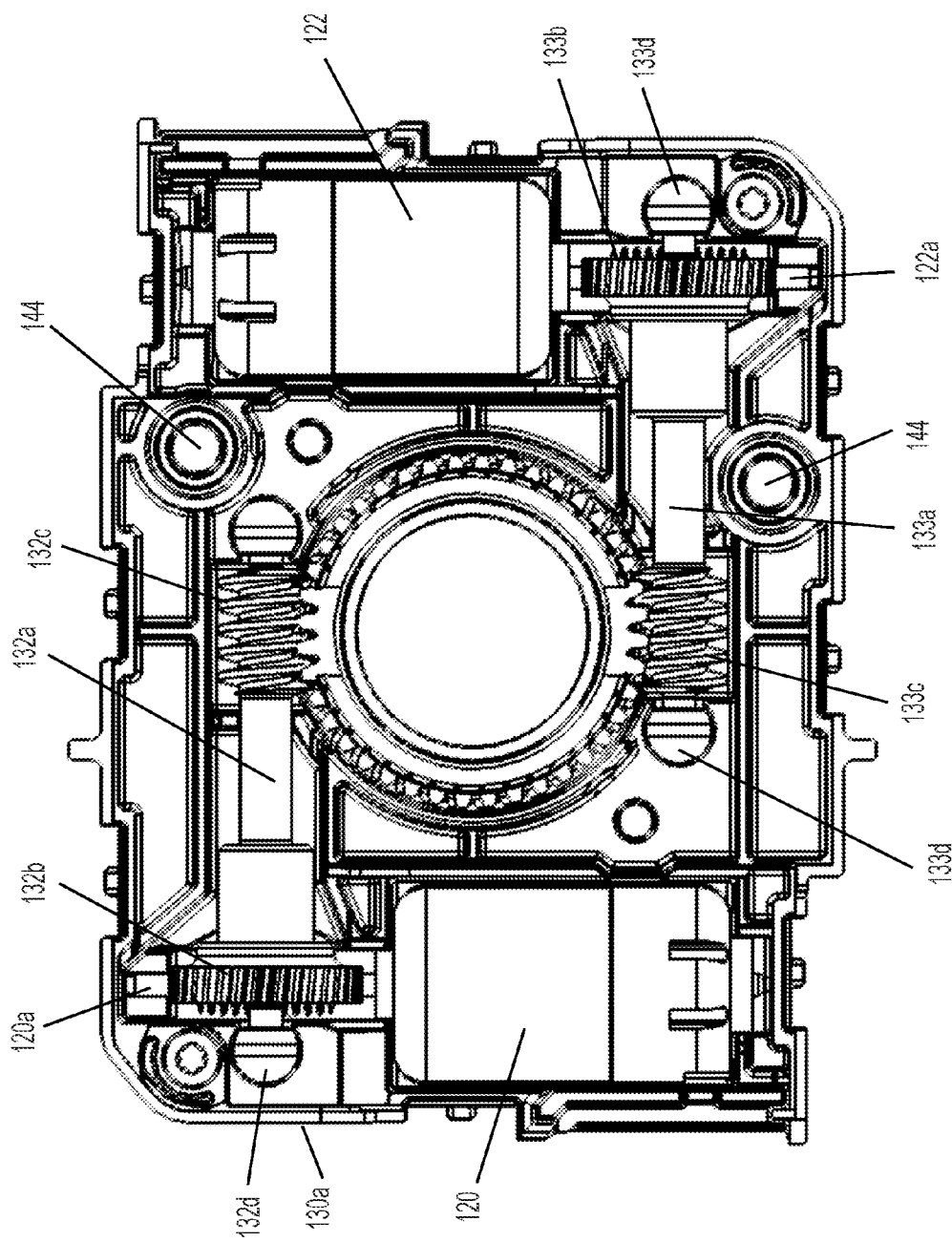
FIG. 15 is another top plan view of the actuator of FIG. 11, shown with the upper cover portion removed.
Figure 16:
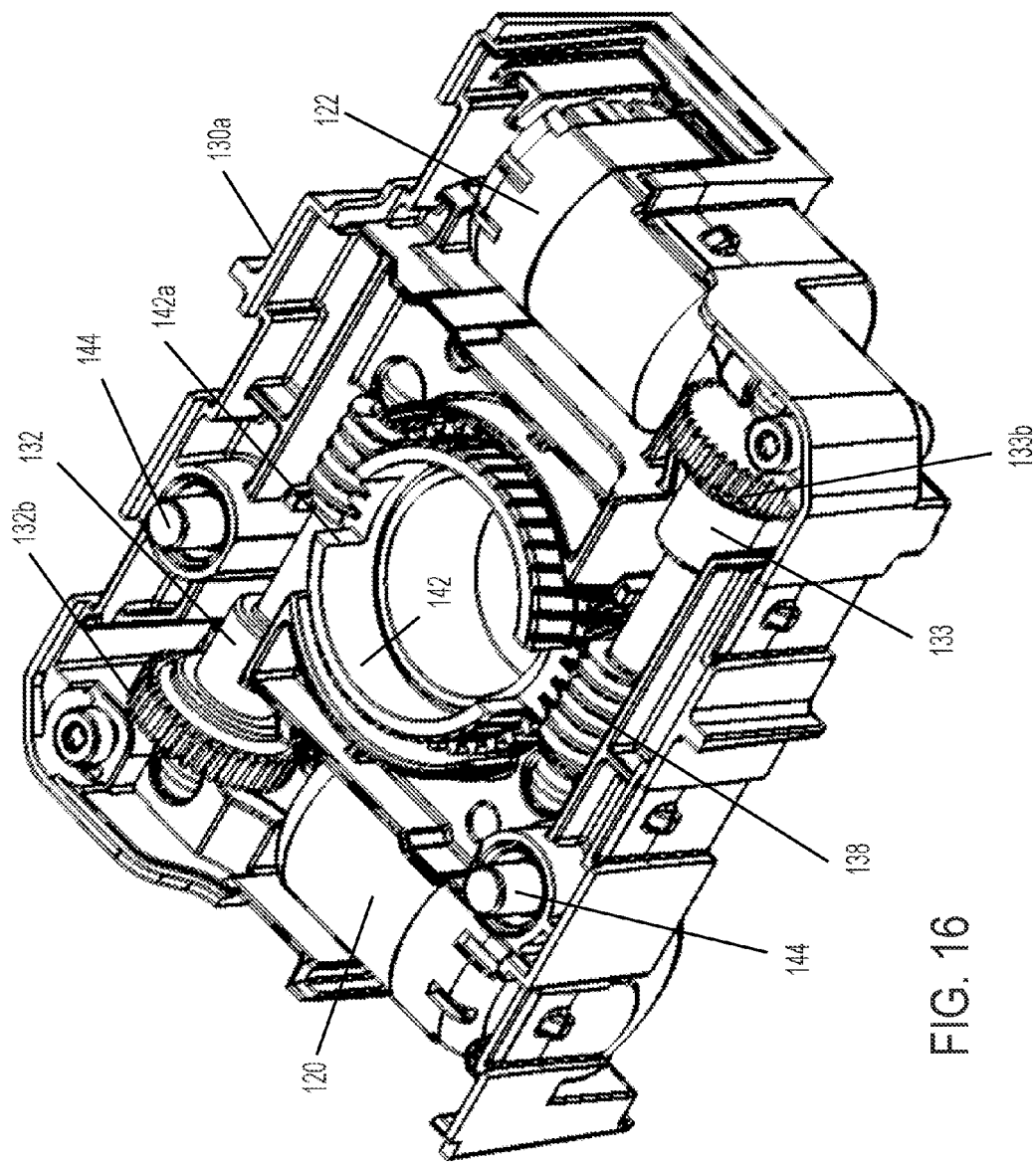
FIG. 16 is a perspective view of the actuator of FIG. 15.
Figure 17:
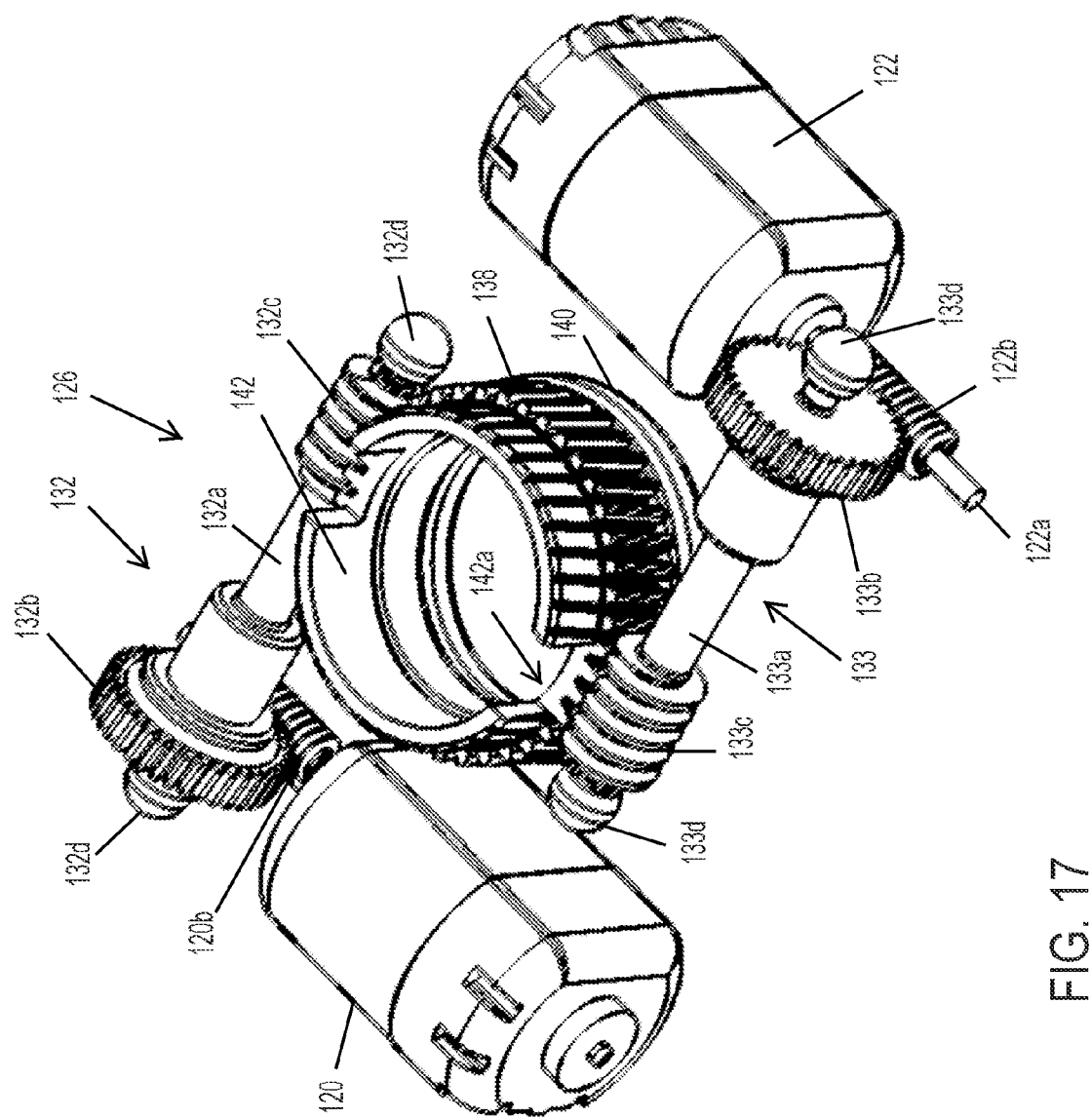
FIG. 17 is a perspective view of the motors and gears of the actuator of FIGS. 11-16.

When a DC motor moves (or, in other words, when the motor rotationally drives and rotationally moves the output shaft of the motor), high current ripples are created when the motor brushes cross adjacent commutator bars. These current ripples in turn cause voltage spikes on the drive signal. During a stall condition, the brushes do not cross the commutator bars so these spikes do not exist. Thus, and as shown in FIGS. 9 and 10, when a drive voltage (shown for example as a DC voltage source in FIG. 10) is applied to the circuit, the normally closed switch, when closed, allows current to flow through the motor for at least the amount of time configured by the delay element. For example, and with reference to FIG. 10, current may flow from the positive terminal at the drive voltage and to the motor (via the diode that bypasses the upstream normally closed switch) and through the motor and through the downstream normally closed switch to ground or the negative terminal of the DC voltage source (see the solid arrows in FIG. 10), while voltage spikes that occur during such operation may be captured by the DC blocking capacitor and a signal indicative of these spikes (see the dashed arrows in FIG. 10) is used to control the delay element and normally closed switch.

During operation of the actuator, the DC blocking capacitor captures the voltage spikes created by the commutation of the motor during movement (or during rotation of the output shaft of the motor during operation of the motor). These spikes are amplified to a usable level and passed through a band-pass filter designed to set the lower threshold of motor speed before the shutoff activates as well as remove spurious high frequency noise. For example, the band-pass filter may have a lower threshold level that represents a selected or appropriate lowermost speed at which the motor can run before the shutoff circuit opens and stops the motor. While the signal is within the designed or selected frequency band, the delay element is repeatedly reset and the switch remains closed (thus allowing for normal operation of the motor and actuator). If the signal frequency is outside the selected frequency band (in other words, if the motor is not moving or is slowly moving at a speed where the frequency of the signal is reduced or below the selected lower threshold frequency), the delay expires and the switch is opened (thus stopping operation of the motor and actuator) and remains opened until the applied voltage is removed and the circuit is reset.

In the illustrated embodiment, the circuit provides bi-directional protection for the motor and can function when current is flowing in either direction from the power source. A diode is used to bypass the run detection circuitry on the high-side of the drive signal to provide such bi-directional protection for the motor. For example, if the high-side of the drive signal is at the upper side of the power source, the system functions as described above, and if the high-side of the drive signal is at the lower side of the power source, the circuit flow is reversed.

Optionally, and with reference to FIGS. 11-17, an actuator assembly 118 includes at least two electrical drive motors 120, 122, which are cooperatively operable to rotatably drive a ring gear 138 via a gear train or gear assembly 126 to pivot a mirror head portion about a generally vertical pivot axis to adjust the mirror head portion relative to the mounting arm, such as in a similar manner as discussed above with respect to actuator 18. Actuator assembly 118 includes a housing portion 130 (having, in the illustrated embodiment, a lower housing portion 130a and an upper housing portion 130b), which may be at least partially received in the mounting arm of the mirror assembly and which houses or supports the drive motors 120, 122, ring gear 138 and gear train 126. The housing portions may be configured or molded to correspond to the shapes of the motor and to provide an inner cavity for receiving the motors 120, 122, common gear 124, gear train 126 and attaching portion 128, and the two housing portions 130a, 130b may attach or mate together (such as via snap clasps or the like) to contain or house the components therein, with the attaching portion 128 disposed at an opening or aperture of the upper housing portion 130b (and interconnected with ring gear 138, such that pivotal movement of ring gear 138 about its axis imparts a corresponding pivotal movement of attaching portion 128 relative to the housing 130).

In the illustrated embodiment, rotary motor 120 is disposed within lower housing portion 130a, and rotary motor 122 is disposed at an opposite side of the ring gear 138 from rotary motor 120. The rotationally driven output shafts 120a, 122a of rotary motors 120, 122 have respective worm gears 120b, 122b and are generally parallel to one another. A gear assembly 132, 133 is disposed between the respective worm gears 120b, 122b and the ring gear 138. In the illustrated embodiment, the gear assemblies 132, 133 comprise a shaft 132a, 133a that is pivotally mounted at the housing, with a ring gear 132b, 133b at or near one end of the shaft that engages the respective worm gear 120b, 122b, and with a worm gear 132c, 133c at or near the other end of the shaft that engages a respective portion of the ring gear 138 (with the worm gears engaging teeth of the ring gear at diametrically opposed sides or regions of the ring gear). The shafts 132a, 133a may be pivotally mounted at the lower housing portion 130a via bearings 132d, 133d that are received in recesses or receiving portions established or molded in the lower housing portion (which may comprise an injection molded polymeric housing portion or the like). Thus, when the worm gears 120b, 122b are rotationally driven by motors 120, 122, both worm gears 120b, 122b rotate their respective gear assemblies 132, 133, which in turn cooperatively rotate and drive the ring gear 138 about its axis.

Similar to the actuator 18, discussed above, ring gear 138 is rotatably supported (such as via bearings 140) at the lower housing portion 130a, so that ring gear 138 is rotatable about a generally vertical axis of rotation when the actuator assembly and exterior rearview mirror assembly are normally mounted at a side of a vehicle. The mirror head attaching portion 128 is fixedly attached at an attaching portion 142 at ring gear 138 (such as via ribs or projections of an actuator attaching portion of attaching portion 128 being received at or partially in slots or receiving portions 142a of ring gear 138), such that rotation of ring gear 138 imparts a corresponding rotation of mirror head attaching portion 128 and thus of the mirror head portion about the generally vertical axis of rotation and relative to the side of the vehicle equipped with the exterior rearview mirror assembly.

Optionally, the actuator and gear assembly or gear train may include a clutch assembly, which may include a gear element and biasing element or spring. Such a clutch assembly may allow for slippage between the gear elements to allow for manual adjustment of the mirror head portion relative to the mounting portion or arm of the mirror assembly. Optionally, a pair of travel stop pins 144 may be disposed at the housing (such as at the lower housing portion 130*a*) to limit pivotal movement of the attaching portion 128. The attaching plate or portion 128 has a mating groove in and along which the stop pins travel when the attaching portion is rotated via operation of the motors 120, 122. The groove terminates at each end at a wall, which the respective stop pin engages to limit or stop further rotational or pivotal movement of the attaching portion relative to the housing. In the illustrated embodiment, the stop pins 144 are received in receiving portions of the lower housing 130*a* and a spring or biasing element 145 is also disposed in the receiving portions to bias or urge the pins towards and into engagement with the attaching portion to maintain engagement with the attaching portion during operation of the actuator.

Thus, the dual motor actuator of the present invention includes two motors (but optionally may include three or more motors) engaged with and driving a common gear. The dual motor arrangement provides increased output torque of the actuator while maintaining the tooth load on the first gear the same as for a single actuator motor (and thus allows for use of typical drive gears without having to implement stronger more robust gears to handle increased output torque of a larger single motor). The actuator of the present invention thus may be used in any mirror application that requires high torque output to pivot large and/or heavy mirror head portions, such as for trailer towing power fold mirror assemblies and/or power extend mirror assemblies and/or the like.

The actuator assembly or device and its motors and gears may comprise any suitable rotational driving device or means, such as rotational driving devices similar to those used in power fold mirror applications (such as the types described in U.S. Pat. Nos. 7,314,285; 7,267,449; 7,159,992; 7,093,946; 6,312,135; 6,243,218 and 5,703,731, which are hereby incorporated herein by reference in their entireties, and may utilize aspects of the indexing and control pivoting of the mirrors described in U.S. Pat. No. 5,703,731) or the like, or may such as pivotal or rotational driving devices or actuators similar to those used in reflective element actuators (such as the types described in U.S. Pat. Nos. 7,722,199; 7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, and/or U.S. patent application Ser. No. 11/504,353, filed Aug. 15, 2006 and published Jan. 4, 2007 as U.S. Publication No. 2007/002477, which are hereby incorporated herein by reference in their entireties). Optionally, the actuator may utilize aspects of the actuators described in U.S. patent application Ser. No. 13/023,747, filed Feb. 9, 2011, now U.S. Pat. No. 8,915,601, and/or U.S. provisional applications, Ser. No. 61/705,876, filed Sep. 26, 2012; Ser. No. 61/697,554, filed Sep. 6, 2012; Ser. No. 61/665,509, filed Jun. 28, 2012; Ser. No. 61/664,438, filed Jun. 26, 2012; Ser. No. 61/647,179, filed May 15, 2012; Ser. No. 61/614,877, filed Mar. 23, 2012; and Ser. No. 61/601,756, filed Feb. 22, 2012, which are all hereby incorporated herein by reference in their entireties.

Optionally, mirror reflector or reflective element may comprise a generally planar glass mirror substrate or substrates (or may comprise a bent or curved substrate or substrates) and may comprise a variably reflective, electro-optic reflective element (having a front and rear substrate with an electro-optic medium sandwiched therebetween) or a single substrate reflective element (such as a planar or curved or bent glass reflective element), while remaining within the spirit and scope of the present invention. The reflective element has a reflector coating for reflecting light incident thereon to provide a rearward field of view to the driver of the vehicle. The reflector coating is disposed at an appropriate surface of the reflective element.

For example, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,626,749; 7,338,177; 7,274,501; 7,255,451; 7,195,381; 7,184,190; 7,004,592; 6,690,268; 6,420,036; 6,286,965; 6,196,688; 6,178,034; 6,154,306; 6,065,840; 6,002,544; 5,910,854; 5,751,489; 5,724,187; 5,668,663; 5,610,756; 5,567,360; 5,535,056; 5,525,264; 5,406,414; 5,253,109; 5,151,816; 5,142,407; 5,140,455; 5,117,346; 5,076,673; 5,073,012 and/or 4,712,879, and/or U.S. patent application Ser. No. 11/226,628, filed Sep. 14, 2005 and published Mar. 23, 2006 as U.S. Publication No. US-2006-0061008, and/or PCT Application No. PCT/US2010/029173, filed Mar. 30, 2010 and published Oct. 7, 2010 as International Publication No. WO 2010/114825, and/or PCT Application No. PCT/US10/32017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are hereby incorporated by reference herein in their entireties. Optionally, the reflective element may include a perimeter metallic band, such as the types described in U.S. Pat. Nos. 7,626,749; 7,255,451; 7,274,501 and 7,184,190, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the reflective element may include indicia formed at and viewable at the reflective element, such as by utilizing aspects of the reflective elements described in U.S. Pat. No. 7,626,749, which are all hereby incorporated herein by reference in their entireties.

Optionally, the reflective element may comprise a single substrate with a reflective coating at its rear surface. The mirror assembly thus may comprise a prismatic mirror assembly or planar or non-planar mirror or other mirror having a single substrate reflective element, such as a mirror assembly utilizing aspects of the mirror assemblies described in U.S. Pat. Nos. 7,289,037; 7,249,860; 6,318,870; 6,598,980; 5,327,288; 4,948,242; 4,826,289; 4,436,371 and 4,435,042, which are hereby incorporated herein by reference in their entireties. Optionally, the reflective element may comprise a conventional prismatic or flat reflective element or prism, or may comprise a prismatic or flat reflective element of the types described in U.S. Pat. Nos. 7,184,190; 7,249,860; 7,255,451; 7,274,501; 7,289,037; 7,338,177; 7,420,756 and/or 7,626,749, which are all hereby incorporated herein by reference in their entireties.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties).

Optionally, the mirror assembly and/or reflective element may include a wide angle reflector or blind spot viewing aid or the like to provide a wide angle field of view of the blind spot area at the side of the vehicle to the driver of the vehicle. Optionally, for example, the mirror assembly may utilize aspects of the reflectors or assemblies described in U.S. Pat. Nos. 7,748,856; 7,255,451; 7,195,381; 6,717,712; 6,315,419; 7,097,312; 6,522,451 and/or 7,126,456, and/or U.S. patent application Ser. No. 12/187,725, filed Aug. 27, 2008, now U.S. Pat. No. 8,786,704, which are hereby incorporated herein by reference in their entireties.

Optionally, the mirror head portion or mirror casing or a back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflective element may comprise a bezelless or frameless reflective element (such as the types described in U.S. Pat. Nos. 7,626,749; 7,184,190 and/or 7,255,451, and/or U.S. patent applications, Ser. No. 11/226,628, filed Sep. 14, 2005 and published Mar. 23, 2006 as U.S. Publication No. US-2006-0061008, which are hereby incorporated herein by reference in their entireties), whereby the back plate may not include a perimeter framing portion or bezel portion around the perimeter of the reflective element.

Optionally, and desirably, the mirror assembly may include a heater element that is disposed at or established at the rear surface of the reflective element to reduce fogging of the reflective element. The heater pad or element at the rear surface of the glass substrate may provide an anti-fogging of de-fogging feature to the exterior mirror assembly, and may utilize aspects of the heater elements or pads described in U.S. Pat. No. 7,400,435 and/or PCT Application No. PCT/US07/82099, filed Oct. 22, 2007 and published on May 2, 2008 as International Publication No. WO 2008/051910, and/or U.S. patent application Ser. No. 13/111,407, filed May 19, 2011 and published Nov. 24, 2011 as U.S. Pub. No. US-2011-0286096, which are hereby incorporated herein by reference in their entireties). The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

Optionally, the mirror assembly may include an indicator or illumination source (such as for backlighting an indicator or indicia at the reflective element), such as by utilizing aspects of the mirror assemblies described in U.S. Pat. Nos. 8,058,977; 7,855,755; 7,492,281; 6,919,796; 6,198,409; 5,929,786 and 5,786,772, which are hereby incorporated herein by reference in their entireties. Optionally, other illumination sources may be included, such as for illuminating a side region at or adjacent to the vehicle or illuminating other regions exterior of the vehicle, such as by utilizing aspects of the mirror assemblies described in U.S. Pat. Nos. 6,669,267; 6,969,101; 6,824,281 and/or 7,188,963, and/or U.S. patent applications, Ser. No. 13/249,433, filed Sep. 30, 2011, now U.S. Pat. No. 8,764,256, and/or Ser. No. 12/596,891, filed Oct. 21, 2009, now U.S. Pat. No. 8,333,492, which are hereby incorporated herein by reference in their entireties.

Optionally, the mirror assembly may include a blind spot indicator and/or a turn signal indicator, such as an indicator or indicators of the types described in U.S. Pat. Nos. 8,058,977; 7,944,371; 7,492,281; 6,198,409; 5,929,786 and 5,786,772, which are hereby incorporated herein by reference in their entireties. The signal indicator or indication module may include or utilize aspects of various light modules or systems or devices, such as the types described in U.S. Pat. Nos. 8,058,977; 7,626,749; 7,581,859; 7,255,451; 6,227,689; 6,582,109; 5,371,659; 5,497,306; 5,669,699; 5,823,654; 6,176,602 and/or 6,276,821, and/or U.S. patent application Ser. No. 12/187,725, filed Aug. 7, 2008, now U.S. Pat. No. 8,786,704, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,720,580; 7,492,281; 7,038,577; 6,882,287; 6,198,409; 5,929,786 and 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786 and/or 5,786,772, and/or U.S. patent applications, and/or U.S. provisional application Ser. No. 60/618,686, filed Oct. 14, 2004 by Laubinger, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 7,005,974 and/or 6,757,109, and/or of the automatic headlamp controls described in U.S. Pat. Nos. 7,526,103; 5,796,094 and/or 5,715,093, and/or of the rain sensors described in U.S. Pat. Nos. 6,250,148 and 6,341,523, and/or of other imaging systems, such as the types described in U.S. Pat. Nos. 6,353,392 and 6,313,454, and/or PCT Application No. PCT/US2010/25545, filed Feb. 16, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,339,149; 5,550,677; 5,760,962; 6,097,023 and 5,796,094, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

The signal indicator or indication module of the exterior rearview mirror assembly may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602 and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the illumination module may also comprise a ground illumination light or puddle lamp, which provides downwardly directed illumination (and which may provide a back lit icon or indicia or logo or the like), such as by utilizing aspects of the illumination systems described in U.S. Pat. Nos. 5,371,659, 5,669,699, 5,823,654 and 5,497,305, and/or U.S. patent application Ser. No. 12/596,891, filed Oct. 21, 2009, now U.S. Pat. No. 8,333,492, which are hereby incorporated herein by reference in their entireties. Optionally, the illumination module or device of the exterior rearview mirror assembly may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Optionally, the exterior rearview mirror assembly may include a camera or imaging sensor that may be part of a multi-camera system, such as an object detection system or a surround view or "bird's eye view" display system or a JapanVue™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012 and published Nov. 1, 2012 as International Publication No. WO 2012/145822, and/or U.S. patent application Ser. No. 13/333,337, filed Dec. 21, 2011 and published Jun. 28, 2012 as U.S. Publication No. US-2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; and/or Ser. No. 61/559,970, filed Nov. 15, 2011, which are hereby incorporated herein by reference in their entireties).

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,370,983; 7,274,501; 7,255,451; 7,184,190; 7,195,381; 6,690,268; 5,668,663 and/or 5,724,187, and/or in U.S. patent applications, Ser. No. 10/538,724, filed Jun. 13, 2005 and published Mar. 9, 2006 as U.S. Publication No. US-2006-0050018, which are all hereby incorporated herein by reference in their entireties, or may include or incorporate video displays or the like, such as the types described in U.S. Pat. Nos. 7,855,755; 7,777,611; 7,370,983 and/or 6,690,268, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror system for a vehicle, said exterior rearview mirror system comprising:
    an exterior rearview mirror assembly;
    said exterior rearview mirror assembly comprising a mounting portion mountable at a side of a vehicle;
    said exterior rearview mirror assembly comprising a mirror head portion pivotally adjustable relative to said mounting portion;
    said exterior rearview mirror assembly comprising a reflective element at said mirror head portion;
    said exterior rearview mirror assembly comprising an actuator operable to impart pivotal movement of said mirror head portion relative to said mounting portion to adjust said mirror head portion relative to the side of a vehicle at which said mounting portion is mounted;
    wherein, upon operation of said actuator, said mirror head portion pivotally moves about a pivot axis;

wherein said actuator comprises a first motor and a second motor;
wherein said first motor and said second motor are operable in tandem to cooperatively rotatably drive a gear to cause said mirror head portion to pivot relative to said mounting portion;
wherein operation of said first motor is synchronized with operation of said second motor; and
wherein said gear has an axis of rotation that is coaxial with said pivot axis.

2. The exterior rearview mirror system of claim 1, wherein said first motor drives said gear at a first portion of said gear and said second motor drives said gear at a second portion of said gear, and wherein said first portion is at a side of said gear opposite from said second portion.

3. The exterior rearview mirror system of claim 2, wherein a first output shaft of said first motor rotatably drives a first worm gear that engages said first portion of said gear, and wherein a second output shaft of said second motor rotatably drives a second worm gear that engages said second portion said gear at an opposite side from said first worm gear.

4. The exterior rearview mirror system of claim 1, wherein said first and second motors are disposed at the same side of said gear.

5. The exterior rearview mirror system of claim 4, wherein an output shaft of said first motor rotatably drives a first worm gear and an output shaft of said second motor rotatably drives a second worm gear, and wherein said first and second worm gears engage an intermediate gear that rotatably drives said gear.

6. The exterior rearview mirror system of claim 5, wherein said intermediate gear is joined with a worm gear that engages said gear.

7. The exterior rearview mirror system of claim 1, wherein said first motor comprises a first drive shaft defining a first axis and wherein said second motor comprises a second drive shaft defining a second axis, and wherein said first axis is oriented parallel to said second axis.

8. The exterior rearview mirror system of claim 1, wherein said exterior rearview mirror assembly comprises a plurality of travel stops configured to limit pivotal movement of said mirror head portion relative to said mounting portion.

9. The exterior rearview mirror system of claim 8, wherein said plurality of travel stops comprises stop pins.

10. The exterior rearview mirror system of claim 1, wherein said gear is interconnected with an attaching portion of said actuator that attaches at one of said mirror head portion and said mounting portion, and wherein rotation of said gear pivots said mirror head portion relative to said mounting portion and about said pivot axis.

11. The exterior rearview mirror system of claim 1, wherein, during operation of said actuator, a shutoff circuit determines rotational movement of a shaft of said first motor and a shaft of said second motor and, responsive to a determination of rotational movement being below a threshold, said shutoff circuit deactivates said first and second motors.

12. The exterior rearview mirror system of claim 1, wherein said exterior rearview mirror assembly comprises a clutch assembly that allows for manual adjustment of said mirror head portion relative to said mounting portion.

13. The exterior rearview mirror system of claim 1, wherein, responsive to operation of said first and second motors, said mirror head portion pivots relative to said mounting portion to adjust said mirror head portion between (i) a rearward viewing position or orientation where said reflective element at said mirror head portion is positioned so as to provide a rearward field of view to a driver of the vehicle and (ii) a folded or stowed position where said mirror head portion is oriented along the side of the vehicle.

14. An exterior rearview mirror system for a vehicle, said exterior rearview mirror system comprising:
an exterior rearview mirror assembly;
said exterior rearview mirror assembly comprising a mounting portion mountable at a side of a vehicle;
said exterior rearview mirror assembly comprising a mirror head portion pivotally adjustable relative to said mounting portion;
said exterior rearview mirror assembly comprising a reflective element at said mirror head portion;
said exterior rearview mirror assembly comprising an actuator operable to impart pivotal movement of said mirror head portion relative to said mounting portion to adjust said mirror head portion relative to the side of a vehicle at which said mounting portion is mounted;
wherein, upon operation of said actuator, said mirror head portion pivotally moves about a pivot axis;
wherein said actuator comprises a first motor and a second motor;
wherein said first motor and said second motor are operable in tandem to cooperatively rotatably drive a gear to cause said mirror head portion to pivot relative to said mounting portion;
wherein operation of said first motor is synchronized with operation of said second motor;
wherein, responsive to operation of said first and second motors, said mirror head portion pivots relative to said mounting portion to adjust said mirror head portion between (i) a rearward viewing position or orientation where said reflective element at said mirror head portion is positioned so as to provide a rearward field of view to a driver of the vehicle and (ii) a folded or stowed position where said mirror head portion is oriented along the side of the vehicle; and
wherein said exterior rearview mirror assembly comprises a clutch assembly that allows for manual adjustment of said mirror head portion relative to said mounting portion.

15. The exterior rearview mirror system of claim 14, wherein said gear has an axis of rotation that is coaxial with said pivot axis.

16. The exterior rearview mirror system of claim 14, wherein said gear is interconnected with an attaching portion of said actuator that attaches at one of said mirror head portion and said mounting portion, and wherein rotation of said gear pivots said mirror head portion relative to said mounting portion and about said pivot axis.

17. An exterior rearview mirror system for a vehicle, said exterior rearview mirror system comprising:
an exterior rearview mirror assembly;
said exterior rearview mirror assembly comprising a mounting portion mountable at a side of a vehicle;
said exterior rearview mirror assembly comprising a mirror head portion pivotally adjustable relative to said mounting portion;
said exterior rearview mirror assembly comprising a reflective element at said mirror head portion;
said exterior rearview mirror assembly comprising an actuator operable to impart pivotal movement of said mirror head portion relative to said mounting portion to adjust said mirror head portion relative to the side of a vehicle at which said mounting portion is mounted;

wherein, upon operation of said actuator, said mirror head portion pivotally moves about a pivot axis;

wherein said actuator comprises a first motor and a second motor;

wherein said first motor and said second motor are operable in tandem to cooperatively rotatably drive a gear to cause said mirror head portion to pivot relative to said mounting portion;

wherein operation of said first motor is synchronized with operation of said second motor;

wherein, responsive to operation of said first and second motors, said mirror head portion pivots relative to said mounting portion to adjust said mirror head portion between (i) a rearward viewing position or orientation where said reflective element at said mirror head portion is positioned so as to provide a rearward field of view to a driver of the vehicle and (ii) a folded or stowed position where said mirror head portion is oriented along the side of the vehicle; and wherein said exterior rearview mirror assembly comprises a plurality of travel stops configured to limit pivotal movement of said mirror head portion relative to said mounting portion.

18. The exterior rearview mirror system of claim 17, wherein said plurality of travel stops comprises stop pins.

19. The exterior rearview mirror system of claim 17, wherein said gear has an axis of rotation that is coaxial with said pivot axis.

20. The exterior rearview mirror system of claim 17, wherein said gear is interconnected with an attaching portion of said actuator that attaches at one of said mirror head portion and said mounting portion, and wherein rotation of said gear pivots said mirror head portion relative to said mounting portion and about said pivot axis.

* * * * *

UNITED STATES PATENT AND TRADEMARK OFFICE
CERTIFICATE OF CORRECTION

PATENT NO.        : 10,315,575 B2                                  Page 1 of 1
APPLICATION NO.   : 15/663980
DATED             : June 11, 2019
INVENTOR(S)       : Justin E. Sobecki et al.

It is certified that error appears in the above-identified patent and that said Letters Patent is hereby corrected as shown below:

In the Specification

Column 5
Line 14, "20$a$," should be --20$b$,--

Signed and Sealed this
Ninth Day of July, 2019

Andrei Iancu
*Director of the United States Patent and Trademark Office*